(12) United States Patent
Oh et al.

(10) Patent No.: US 10,628,012 B2
(45) Date of Patent: Apr. 21, 2020

(54) MOBILE TERMINAL HAVING FRONT SURFACE AND REAR SURFACE WITH PRESET INPUT APPLIED TO REAR INPUT UNIT CAUSING PORTION OF SCREEN INFORMATION AND PORTION OF HOME SCREEN DISPLAYED TOGETHER ON FRONT SURFACE

(71) Applicant: LG ELECTRONICS INC., Seoul (KR)

(72) Inventors: Sesook Oh, Seoul (KR); Samsick Kim, Seoul (KR); Jongin Lim, Seoul (KR); Kyungjin Moon, Seoul (KR); Sungjin Kang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 93 days.

(21) Appl. No.: 15/541,277

(22) PCT Filed: Mar. 10, 2015

(86) PCT No.: PCT/KR2015/002309

§ 371 (c)(1),
(2) Date: Jun. 30, 2017

(87) PCT Pub. No.: WO2016/117757

PCT Pub. Date: Jul. 28, 2016

(65) Prior Publication Data

US 2018/0024727 A1 Jan. 25, 2018

(30) Foreign Application Priority Data

Jan. 21, 2015 (KR) .......................... 10-2015-0010178

(51) Int. Cl.
*H03K 19/00* (2006.01)
*H04N 1/00* (2006.01)
(Continued)

(52) U.S. Cl.
CPC ........ *G06F 3/04845* (2013.01); *G06F 1/1692* (2013.01); *G06F 3/0485* (2013.01);
(Continued)

(58) Field of Classification Search
CPC .. G06F 3/0488; G06F 3/04883; H04M 1/236; H04M 1/72583
(Continued)

(56) References Cited

U.S. PATENT DOCUMENTS

| 2008/0125181 | A1* | 5/2008 | Yoon | ..................... G06F 1/1622 |
| | | | | 455/566 |
| 2009/0201260 | A1* | 8/2009 | Lee | ..................... G06F 3/04883 |
| | | | | 345/173 |

(Continued)

FOREIGN PATENT DOCUMENTS

| KR | 20100032660 | 3/2010 |
| KR | 20140067334 | 6/2014 |

(Continued)

OTHER PUBLICATIONS

PCT International Application No. PCT/KR2015/002309, International Search Report dated Oct. 22, 2015, 2 pages.

*Primary Examiner* — Luu-Phuong T Nguyen
(74) *Attorney, Agent, or Firm* — Lee, Hong, Degerman, Kang & Waimey

(57) ABSTRACT

The present invention may comprise: a terminal body having a front surface and a rear surface; a display unit disposed on the front surface and configured to output first screen information; a rear input unit disposed on the rear surface and configured to receive a touch input; and a control unit which, when a predetermined touch input is received by the rear input unit, controls the display unit to display a window area on at least one area of the first screen information, wherein the window area is displayed while a touch is sensed by the rear input unit, and a apart of second screen information, which has been output on the display unit before the first screen information is output, is displayed in the window.

19 Claims, 31 Drawing Sheets

(51) Int. Cl.

| | |
|---|---|
| *G06F 3/0484* | (2013.01) |
| *H04M 1/23* | (2006.01) |
| *G06F 1/16* | (2006.01) |
| *G06F 3/0485* | (2013.01) |
| *G06F 3/0488* | (2013.01) |
| *G06F 3/0486* | (2013.01) |
| *H04M 1/725* | (2006.01) |
| *G06F 3/0481* | (2013.01) |

(52) U.S. Cl.
CPC ........ *G06F 3/0486* (2013.01); *G06F 3/04883* (2013.01); *G06F 3/04886* (2013.01); *H04M 1/236* (2013.01); *H04M 1/72583* (2013.01); *G06F 3/04817* (2013.01); *G06F 2203/0382* (2013.01); *G06F 2203/04103* (2013.01); *G06F 2203/04104* (2013.01); *G06F 2203/04806* (2013.01); *H04M 2250/22* (2013.01)

(58) Field of Classification Search
USPC .......................................................... 715/798
See application file for complete search history.

(56) References Cited

U.S. PATENT DOCUMENTS

| | | | | |
|---|---|---|---|---|
| 2010/0056220 | A1* | 3/2010 | Oh | G06F 1/1616 455/566 |
| 2011/0072345 | A1* | 3/2011 | Lim | G06F 3/016 715/702 |
| 2012/0231884 | A1* | 9/2012 | Sakai | G06F 1/1626 463/31 |
| 2012/0276958 | A1* | 11/2012 | Inami | H04M 1/0237 455/566 |
| 2012/0309478 | A1* | 12/2012 | Kotsugai | A63F 13/426 463/3 |
| 2013/0007653 | A1* | 1/2013 | Stolyarov | G06F 1/1626 715/784 |
| 2013/0167081 | A1* | 6/2013 | Park | G06F 3/0481 715/804 |
| 2013/0201211 | A1* | 8/2013 | Kim | G06T 11/60 345/632 |
| 2014/0004907 | A1* | 1/2014 | Kim | H04M 1/72519 455/566 |
| 2014/0108933 | A1* | 4/2014 | Lee | G06F 3/04883 715/722 |
| 2014/0145989 | A1* | 5/2014 | Lee | G06F 3/04886 345/173 |
| 2014/0164976 | A1* | 6/2014 | Kim | G06F 1/1643 715/773 |
| 2014/0267546 | A1* | 9/2014 | Kwon | H04N 7/142 348/14.02 |
| 2016/0188181 | A1* | 6/2016 | Smith | G06F 3/048 715/765 |

FOREIGN PATENT DOCUMENTS

| | | |
|---|---|---|
| KR | 20140095733 | 8/2014 |
| KR | 20140101320 | 8/2014 |
| KR | 20140144120 | 12/2014 |

* cited by examiner

FIG. 4A
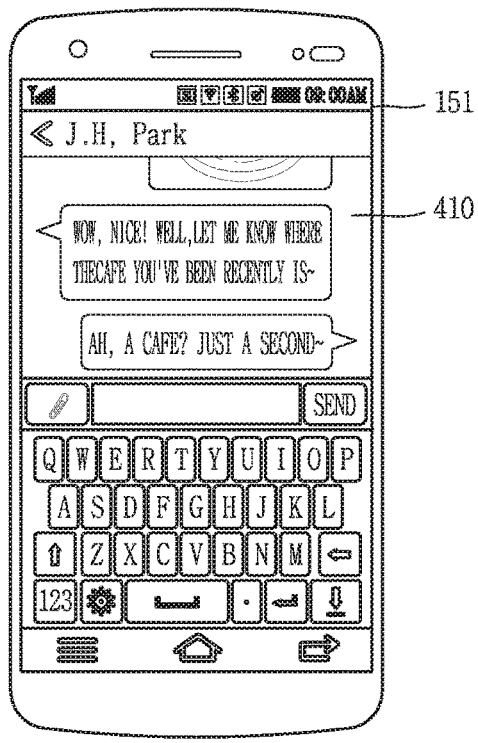
FIG. 4B
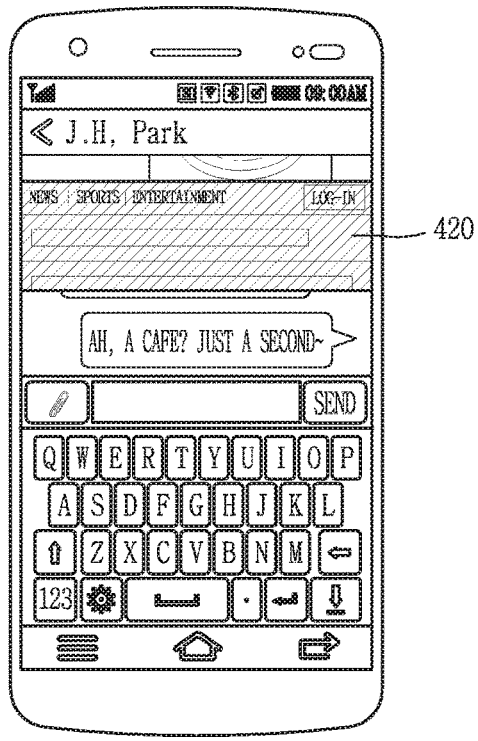 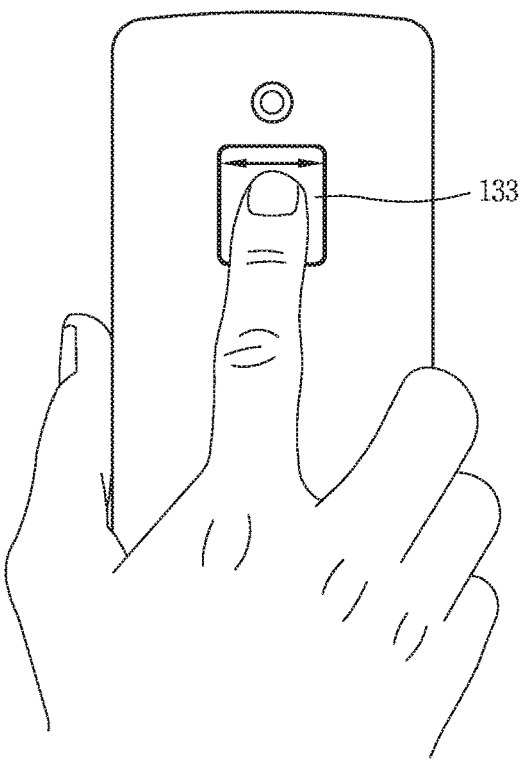

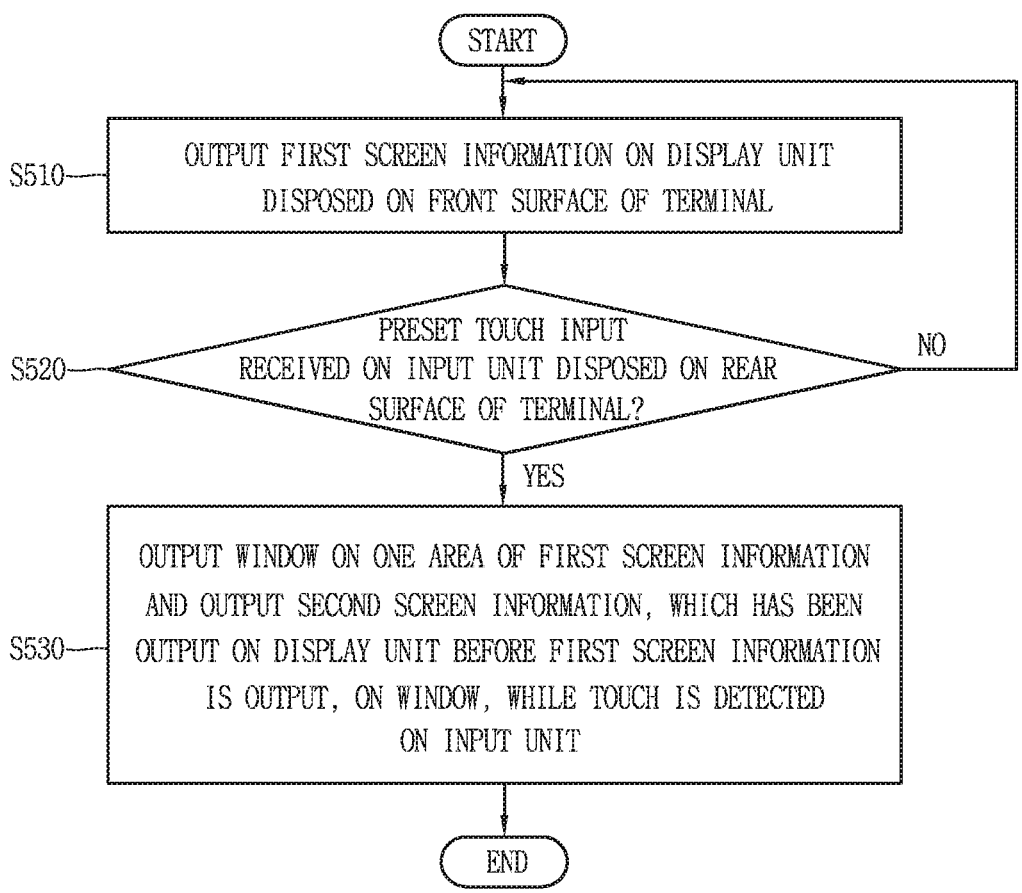

ମOBILE TERMINAL HAVING FRONT SURFACE AND REAR SURFACE WITH PRESET INPUT APPLIED TO REAR INPUT UNIT CAUSING PORTION OF SCREEN INFORMATION AND PORTION OF HOME SCREEN DISPLAYED TOGETHER ON FRONT SURFACE

CROSS-REFERENCE TO RELATED APPLICATIONS

This application is the National Stage filing under 35 U.S.C. 371 of International Application No. PCT/KR2015/002309, filed on Mar. 10, 2015, which claims the benefit of earlier filing date and right of priority to Korean Application No. 10-2015-0010178, filed on Jan. 21, 2015, the contents of which are all hereby incorporated by reference herein in their entirety.

TECHNICAL FIELD

The present disclosure relates to a mobile terminal having an input unit receiving a touch input.

BACKGROUND ART

A mobile terminal is a portable/mobile electronic device which is portable and has functions of placing a voice call and a video call, inputting/outputting information, storing data and the like.

As it becomes multifunctional, a mobile terminal can be allowed to capture still images or moving images, play music or video files, receive broadcast, play games, and the like, so as to be implemented as an integrated multimedia player.

New efforts are ongoing to implement functionalities of multimedia devices. Such efforts include software and hardware improvements. As one example, a user interface environment is provided in order for users to easily and conveniently retrieve or select functions.

Also, many users have their mobile terminals to express their own personalities, and accordingly, various design factors are required for the mobile terminals. The design factors may include structural changes and improvements for users to use the mobile terminal more conveniently. As one of the structural change and development, a user input unit may be taken into account.

For example, a user input unit is implemented as a touch screen or a separately-provided key on a front surface, so as to receive a user input. However, the touch screen has a disadvantage in that an object to be manipulated is obscured by a finger or a stylus pen. A key separately provided on a front or side surface of a terminal body to obviate this disadvantage, however, interferes with a slim and simple design of the terminal. Therefore, a key or touchpad provided on a rear surface of the terminal body may be considered as a user input unit with a new structure capable of solving these disadvantages.

DISCLOSURE OF THE INVENTION

Therefore, an aspect of the detailed description is to provide a mobile terminal, capable of providing a new user interface environment using an input unit provided on a rear surface of a terminal body, and accordingly controlling a screen output on a front display unit.

Another aspect of the detailed description is to provide a mobile terminal, capable of temporarily checking a task currently-executed on a background or executing a function associated with the corresponding task, while maintaining a current output state of a display unit.

To achieve these and other advantages and in accordance with the purpose of the present invention, as embodied and broadly described herein, there is provided a mobile terminal, including a terminal body provided with a front surface and a rear surface, a display unit disposed on the front surface to output first screen information, a rear input unit disposed on the rear surface to receive a touch input, and a controller configured to control a window area to be output in at least one area of the first screen information when a preset touch input is applied to the rear input unit. The window area may be displayed while the touch is detected on the rear input unit, and display therein a part of second screen information which has been output on the display unit before the first screen information is output.

In one embodiment disclosed herein, the preset touch input may be an input that is applied to the rear input unit and then dragged to left and right or up and down by a predetermined number of times or dragged in a preset pattern. The displayed window area may disappear when a touch-up event is generated on the rear input unit.

In one embodiment disclosed herein, the controller may control the window area and a part of the second screen information displayed in the window area to gradually disappear when the touch-up event is generated on the rear input unit, and control the window area and the part of the second screen information displayed in the window area to appear again when a touch-down event is generated on the rear input unit within a reference time.

In one embodiment disclosed herein, the controller may control a size of the window area to differ according to pressure strength of a touch input applied to the rear input unit in a perpendicular direction.

In one embodiment disclosed herein, the controller may change a displayed position of the window area as a touch applied to the rear input unit is moved up and down in the displayed state of the window area.

In one embodiment disclosed herein, the controller may display the window area on a position of the display unit corresponding to a point where a touch has been initially applied to the rear input unit.

In one embodiment disclosed herein, the display unit nay be configured to detect a touch input, and the controller may output a handler on a boundary area of the displayed window area when a touch is applied to the boundary area, and change at least one of a size and a position of the window area as the touch applied to the handler is dragged.

In one embodiment disclosed herein, the display unit may be configured to detect a touch input, and the controller may control a part of screen information displayed in the window area to disappear and an obscured part of the first screen information to appear along a trajectory of the touch, when a touch started from a point outside the window area on the display unit is moved into the window area.

In one embodiment disclosed herein, the display unit may be configured to detect a touch input, and the controller may move a first area displayed within the window area along a drag input when the drag input is applied within the displayed window area, and control a second area different from the first area to be displayed on a position where the first area has been displayed.

In one embodiment disclosed herein, the display unit may be configured to detect a touch input, and the controller may control a control command by a touch input, applied to the display unit, to be executed within the window area when the touch input is made within the window area, and control a control command by a touch input, applied to the display unit, to be executed with respect to the first screen information when the touch input is made outside the window area.

In one embodiment disclosed herein, the controller may display a part of screen information corresponding to one of a plurality of tasks in the window area when the plurality of tasks have been output on the display unit before the first screen information is output, and control an icon notifying another task without being displayed to be displayed on one portion of the window area.

In one embodiment disclosed herein, when a touch input is applied to the rear input unit in one direction in the state where the part of the screen information corresponding to the one task is displayed in the window area, the controller may switch the part of the screen information corresponding to the one task displayed in the window area into a part of screen information corresponding to another task corresponding to the touch input.

In one embodiment disclosed herein, the controller may control the part of the screen information of the one task to gradually disappear and the part of the screen information corresponding to the another task to gradually appear, as the touch input is applied to the rear input unit in the one direction.

In one embodiment disclosed herein, when the part of the screen information corresponding to the one task is switched into the part of the screen information corresponding to the another task, the controller may control an icon notifying the one task to be displayed on a position of the window area corresponding to the applied direction of the touch input.

In one embodiment disclosed herein, the controller may switch the part of the screen information corresponding to the one task displayed in the window area into a part of a home screen, when the another task corresponding to the touch input applied in the one direction is not present.

In one embodiment disclosed herein, when at least one content selected in the window area is dragged to an output area of the first screen information, the controller may control a control command related to the selected content to be executed in the output area of the first screen information.

In one embodiment disclosed herein, the controller may cancel the execution of the control command related to the selected content when a touch-up event is generated on the rear input unit while the selected content is dragged.

In one embodiment disclosed herein, the controller may switch the first screen information into second screen information displayed in the window area when a size of the window area exceeds a reference range, and control the part of the first screen information to be displayed within the window area, in response to a preset touch input being applied to the rear input unit.

In one embodiment disclosed herein, the controller may fix a first window area when a second touch input is applied to the rear input unit while the first window area is displayed in at least one area of the first screen information, and control a second window area, distinguished from the first window area, to be displayed in one area of the first screen information, when the preset touch input is applied to the rear input unit.

In one embodiment disclosed herein, the fixed first window area may display thereon a delete icon for executing deletion. The fixed first window area may disappear and the second window area may be displayed on a position where the first window area has been displayed when the delete icon is selected.

Advantageous Effect

In a mobile terminal according to embodiments of the present invention, a new type of user interface can be implemented by using a user input unit provided on a rear surface of a terminal body, and effective multitasking can be executed by allowing use of he rear input unit to check or control a screen of an application currently executed in a background. Also, a screen of an application currently executed in a background can be output through the rear input unit and a screen displayed in a foreground can be controlled through a front touch screen, thereby more intuitively controlling a plurality of layered screens according to positions of the input units. In addition, a screen of an application currently executed in a background can be popped up only while a touch is applied to the rear input unit, and then the popped-up screen can disappear when the touch is released. This may allow user-desired information to be quickly caught in different tasks and minimize a time for which a screen currently output in the foreground is obscured.

BRIEF DESCRIPTION OF THE DRAWINGS

FIGS. 4A to 4C are conceptual views illustrating a method of outputting a window on a front display unit using a touch input applied to a rear input unit, in a mobile terminal according to the present invention.

FIG. 5 is a representative flowchart illustrating a method for controlling a mobile terminal according to the present invention.

MODES FOR CARRYING OUT THE PREFERRED EMBODIMENTS

Description will now be given in detail of a mobile terminal according to the exemplary embodiments disclosed herein, with reference to the accompanying drawings.

For the sake of brief description with reference to the drawings, the same or equivalent components may be provided with the same or similar reference numbers, and description thereof will not be repeated. A singular representation may include a plural representation unless it represents a definitely different meaning from the context. In general, a suffix such as "module" and "unit" may be used to refer to elements or components. Use of such a suffix herein is merely intended to facilitate description of the specification, and the suffix itself is not intended to give any special meaning or function.

Mobile terminals presented herein may be implemented using a variety of different types of terminals. Examples of such terminals include cellular phones, smart phones, laptop computers, digital broadcast terminals, personal digital assistants (PDAs), portable multimedia players (PMPs), E-books, navigators, and the like.

Figure 1:
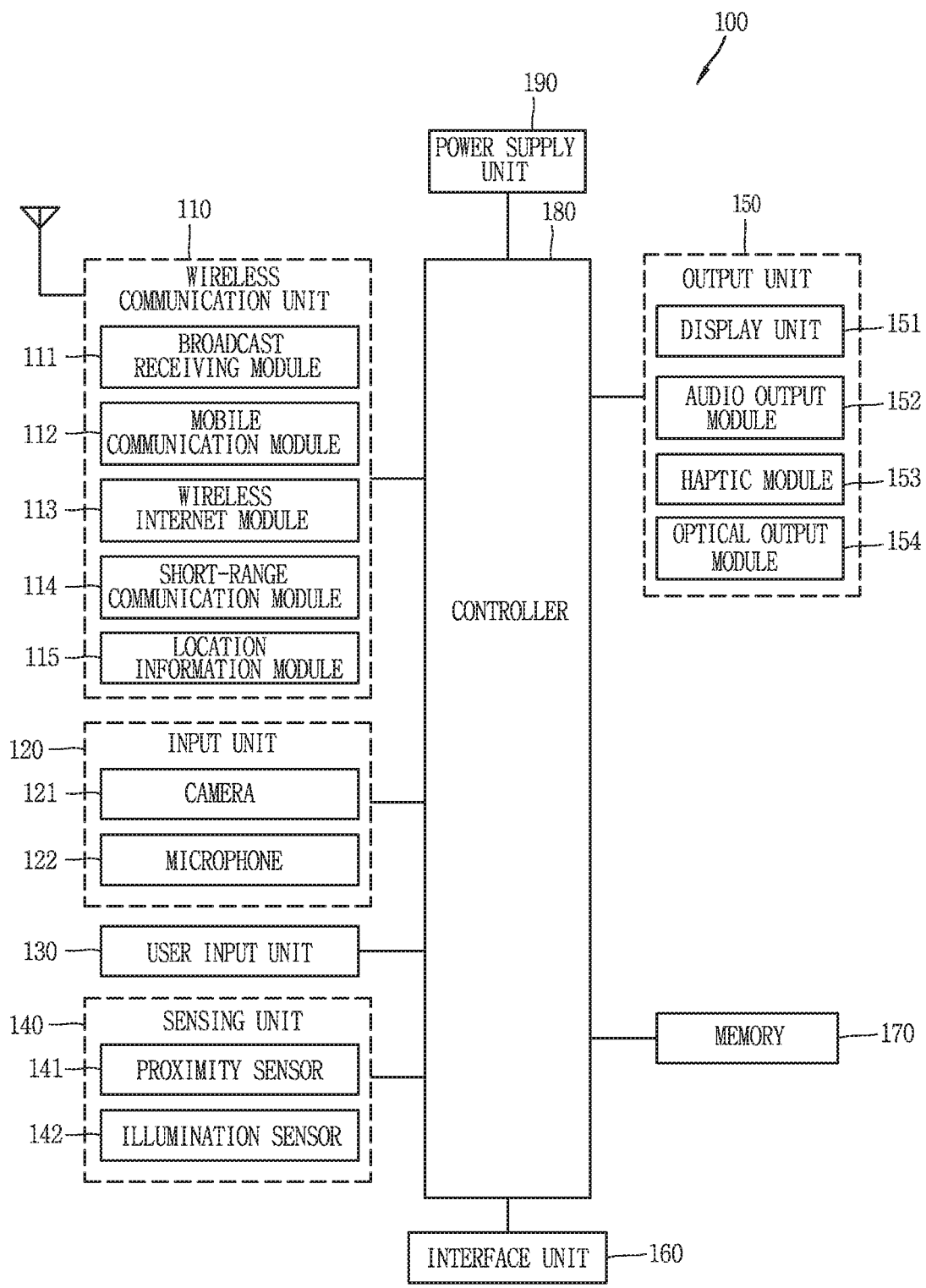
FIG. 1 is a block diagram of a mobile terminal in accordance with one exemplary embodiment.

FIG. 1 is a block diagram of a mobile terminal 100 in accordance with one embodiment of the present invention.

The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal having various components, but it may be understood that implementing all of the illustrated components is not a requirement. Greater or fewer components may alternatively be implemented.

Hereinafter, each component will be described in sequence.

The wireless communication unit 110 may typically include one or more modules which permit wireless communications between the mobile terminal 100 and a wireless communication system or between the mobile terminal 100 and a network within which the mobile terminal 100 is located. For example, the wireless communication unit 110 may include at least one of a broadcast receiving module 111, a mobile communication module 112, a wireless Internet module 113, a short-range communication module 114, a location information module 115 and the like.

The broadcast receiving module 111 may receive a broadcast signal and/or broadcast associated information from an external broadcast managing entity via a broadcast channel.

The broadcast channel may include a satellite channel and a terrestrial channel. The broadcast managing entity may indicate a server which generates and transmits a broadcast signal and/or broadcast associated information or a server which receives a pre-generated broadcast signal and/or broadcast associated information and sends them to the mobile terminal. The broadcast signal may be implemented as a TV broadcast signal, a radio broadcast signal, and a data broadcast signal, among others. The broadcast signal may further include a data broadcast signal combined with a TV or radio broadcast signal.

Examples of the broadcast associated information may include information associated with a broadcast channel, a broadcast program, a broadcast service provider, or the like. The broadcast associated information may also be provided via a mobile communication network, and, in this case, received by the mobile communication module 112.

The broadcast associated information may be implemented in various formats. For instance, broadcast associated information may include Electronic Program Guide (EPG) of Digital Multimedia Broadcasting (DMB), Electronic Service Guide (ESG) of Digital Video Broadcast-Handheld (DVB-H), and the like.

The broadcast receiving module 111, for example, may be configured to receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and the like. The broadcast receiving module 111 may be configured to be suitable for every broadcast system transmitting broadcast signals as well as the digital broadcasting systems.

Broadcast signals and/or broadcast associated information received via the broadcast receiving module 111 may be stored in a suitable device, such as a memory 160.

The mobile communication module 112 may transmit/receive wireless signals to/from at least one of network entities, for example, abase station, an external mobile terminal, a server, and the like, on a mobile communication network. Here, the wireless signals may include audio call signal, video (telephony) call signal, or various formats of data according to transmission/reception of text/multimedia messages.

The wireless Internet module 113 denotes a module for wireless Internet access. This module may be internally or externally coupled to the mobile terminal 100. Examples of such wireless Internet access may include Wireless LAN (WLAN), Wireless Fidelity (Wi-Fi) Direct, Wireless Broadband (Wibro), Worldwide Interoperability for Microwave Access (Wimax), High Speed Downlink Packet Access (HSDPA) and the like.

The short-range communication module 114 denotes a module for short-range communications. Suitable technologies for implementing this module may include BLUETOOTH™, Radio Frequency IDentification (RFID), Infrared Data Association (IrDA), Ultra-WideBand (UWB), ZigBee, Near Field Communication (NFC) and the like.

The location information module 115 denotes a module for detecting or calculating a position of the mobile terminal. An example of the location information module 115 may include a Global Position System (GPS) module or a WiFi module.

Still referring to FIG. 1, the A/V input unit 120 may be configured to provide an audio or video signal input to the mobile terminal. The A/V input unit 120 may include a camera 121 and a microphone 122. The camera 121 may receive and process image frames of still pictures or video obtained by image sensors in a video call mode or a capture mode. The processed image frames may be displayed on a display unit 151.

The image frames processed by the camera 121 may be stored in the memory 160 or transmitted to an external device via the wireless communication unit 110. Also, user's position information and the like may be calculated from the image frames acquired by the camera 121. Two or more cameras 121 may be provided according to the configuration of the mobile terminal.

The microphone 122 may receive an external audio signal while the mobile terminal is in a particular mode, such as a phone call mode, a recording mode, a voice recognition mode, or the like. This audio signal may then be processed into digital data. The processed digital data may be converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate data input by a user to control the operation of the mobile terminal. The user input unit 130 may include a keypad, a dome switch, a touchpad (e.g., static pressure/capacitance), a jog wheel, a jog switch and the like.

The sensing unit 140 may provide status measurements of various aspects of the mobile terminal. For instance, the sensing unit 140 may detect an open/close status of the mobile terminal 100, a location of the mobile terminal 100, a presence or absence of user contact with the mobile terminal 100, an orientation of the mobile terminal 100, acceleration/deceleration of the mobile terminal 100, and the like, so as to generate a sensing signal for controlling the operation of the mobile terminal 100. For example, regarding a slide phone type mobile terminal, the sensing unit 140 may sense whether the slide phone type mobile terminal is open or closed. Other examples may include sensing statuses, the presence or absence of power provided by the power supply 190, the presence or absence of a coupling or other connection between the interface unit 170 and an external device, and the like.

The output unit 150 may be configured to output an audio signal, a video signal or a tactile signal. The output unit 150 may include a display unit 151, an audio output module 152, an alarm unit 153, a haptic module 154.

The display unit 151 may output information processed in the mobile terminal 100. For example, when the mobile terminal is operating in a phone call mode, the display unit 151 may provide a User Interface (UI) or a Graphic User Interface (GUI), which includes information associated with the call. As another example, if the mobile terminal is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and the like.

Some of such displays may be implemented as a transparent type or an optical transparent type through which the exterior is visible, which is referred to as a transparent display. A representative example of the transparent display may include a Transparent OLED (TOLED), or the like. The rear surface of the display unit 151 may also be implemented to be optically transparent. Under this configuration, a user can view an object positioned at a rear side of a terminal body through a region occupied by the display unit 151 of the terminal body.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151, or a capacitance occurring from a specific part of the display unit 151, into electric input signals. Also, the touch sensor may be configured to sense not only a touched position and a touched area, but also touch pressure.

When touch inputs are sensed by the touch sensors, corresponding signals may be transmitted to a touch controller. The touch controller may process the received signals, and then transmit corresponding data to the controller 180. Accordingly, the controller 180 may sense which region of the display unit 151 has been touched.

Still referring to FIG. 1, a proximity sensor 141 may be arranged at an inner region of the mobile terminal covered by the touch screen, or near the touch screen. The proximity sensor 141 may be provided as one example of the sensing unit 140. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible output signals related to a particular function (e.g., a call signal reception sound, a message reception sound, etc.) performed by the mobile terminal 100. The audio output module 152 may include a receiver, a speaker, a buzzer or the like.

The alarm unit 153 may output a signal for informing about an occurrence of an event of the mobile terminal 100. Events generated in the mobile terminal, for example, may include call signal reception, message reception, key signal inputs, a touch input, etc. In addition to video or audio signals, the alarm unit 153 may output signals in a different manner, for example, using vibration to inform of an occurrence of an event. The video or audio signals may also be output via the display unit 151 and the audio output module 152. Hence, the display unit 151 and the audio output module 152 may be classified as parts of the alarm unit 153.

A haptic module 154 may generate various tactile effects the that user may feel. A typical example of the tactile effect generated by the haptic module 154 is vibration. Strength, pattern and the like of the vibration generated by the haptic module 154 may be controllable by a user selection or setting of the controller. For example, different vibrations may be combined to be outputted or sequentially outputted.

Besides vibration, the haptic module 154 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 154 may be implemented to allow the user to feel a tactile effect through a muscle sensation such as the user's fingers or arm, as well as transferring the tactile effect through a direct contact. Two or more haptic modules 154 may be provided according to the configuration of the mobile terminal 100.

The memory 160 may store programs used for operations performed by the controller, or may temporarily store input and/or output data (for example, a phonebook, messages, still images, video, etc.). In addition, the memory 160 may store data regarding various patterns of vibrations and audio signals output when a touch input is sensed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 may serve as an interface with every external device connected with the mobile terminal 100. For example, the interface unit 170 may receive data transmitted from an external device, receive power to transfer to each element within the mobile terminal 100, or transmit internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied to the mobile terminal 100 therethrough or may serve as a passage to allow various command signals input by the user from the cradle to be transferred to the mobile terminal therethrough. Various command signals or power input from the cradle may operate as signals for recognizing that the mobile terminal is properly mounted on the cradle.

The controller 180 may typically control the general operations of the mobile terminal 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters or images, respectively.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself.

For software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Explaining the user input unit 130 again, the user input unit 130 disclosed herein may be disposed on a rear surface of the terminal and thus a front display can be implemented as a larger screen. Hereinafter, a detailed structure of the user input unit 130 disposed on the rear surface and operations implemented accordingly will be described in more detail.

Figure 2A:
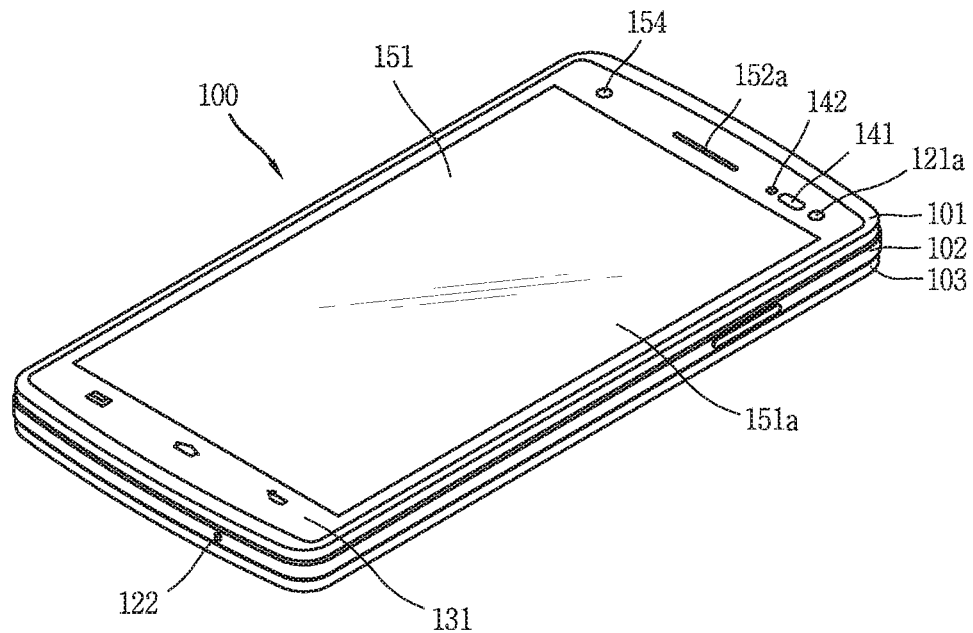
FIGS. 2A and 2B are perspective views of one example of a mobile terminal according to the present invention, viewed from different directions.
Figure 2B:
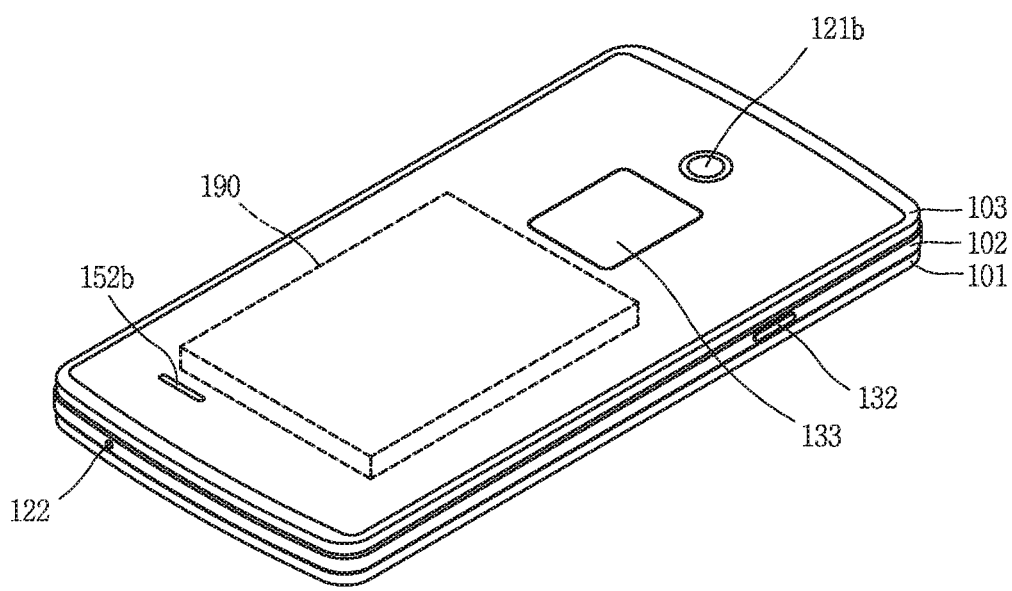

FIGS. 2A and 2B are perspective views illustrating one example of the mobile terminal 100 disclosed herein, viewed in different directions.

The mobile terminal 100 may be provided with a bar-like terminal body. However, the present invention is not limited to this, and the mobile terminal 100 may alternatively be implemented in any of a variety of different configurations. Examples of such configurations include slide-type, foldertype, swing-type, swivel-type and the like, in which two and more bodies are combined with each other in a relatively movable manner.

The body includes a case (casing, housing, cover, etc.) forming the appearance of the terminal. In this embodiment, the case may be divided into a front case 101, a rear case 102 and a battery cover 103. Various electronic components are incorporated into a space formed between the front case 101 and the rear case 102. At least one middle case may be additionally disposed between the front case 101 and the rear case 102.

The cases may be formed by injection-molding a synthetic resin or may be also formed of a metal, for example, stainless steel (STS), titanium (Ti), or the like.

A display unit 151, an audio output module 152a, a camera module 121 and the like may be disposed on the terminal body, generally on the front case 101, and a microphone 122, a side input unit 132, an interface unit 160 and the like may be provided on a lateral surface thereof.

The display unit 151 occupies most of a periphery of the front case 101. That is, the display unit 151 is disposed on the front surface of the terminal body to output visual information. The audio output module 152a and the camera module 121a are disposed on an area adjacent to one of both end portions of the display unit 151, and the front input unit 131 is disposed on an area adjacent to another end portion.

The front input unit 131 as one example of the user input unit 130 (see FIG. 1) and may include a plurality of manipulation units. The manipulation units may also be commonly referred to as a manipulating portion, and may employ any tactile method that allows the user to perform manipulation in a tactile manner. In the embodiment disclosed herein, the front input unit 131 is configured as a touch key. However, the present invention may be limited to this, and a push key may be added to the front input unit 131.

Also, the display unit 151 may configured a touch screen together with a touch sensor, and in this instance, the touch screen may be the user input unit 130. This may allow for implementing a configuration without the front input unit 131 on the front surface of the terminal. In this case, the mobile terminal 100 may allow an input operation with respect to the terminal body only by the display unit 151 and a rear input unit 133 to be explained later.

The side input unit 132 configured as another example of the user input unit 130 may receive a command, such as adjusting a volume of sounds output from the audio output module 152a or switching into a touch recognition mode of the display unit 151.

Referring to FIG. 2B, the camera module 121b is further mounted on the rear side of the terminal body, namely, the rear case 102. The camera module 121b may be a camera that has an image capturing direction that is substantially opposite to the camera 221 (see FIG. 2A) and has a pixel resolution different from the camera module 121a.

For example, the front camera module 121a may have a lower pixel resolution sufficient to capture and transmit a picture of user's face for a video call, while the rear camera module 121b may have a higher resolution for capturing a general subject for photography without transmitting the captured subject. The camera modules 121a and 121b may be installed at the terminal body so that it can rotate or pop up.

A flash (not illustrated) and a mirror (not illustrated) may additionally be provided adjacent to the camera module 121b. The flash projects light towards a subject in case of photographing the subject using the camera module 121b. If a user wants to take a picture of himself (self-photography) using the camera module 121b, the mirror may enable the user to view his face.

An additional audio output unit 152b may be provided on the rear surface of the terminal body. The additional audio output unit 152b may implement a stereo function together with the audio output unit 152a (see FIG. 2A), and may be used to implement a speakerphone mode in talking over the terminal.

The power supply unit 190 for supplying power to the mobile terminal 100 is provided in the terminal body. The power supply unit 190 may be configured to be built within the terminal body, or may be detachably connected to the terminal body.

As illustrated, the rear input unit 133 may be disposed on the rear surface of the terminal body. The rear input unit 133 may be located adjacent to the camera module 121b, for example.

The rear input unit 133 is manipulated by a user to input a command for controlling an operation of the mobile terminal 100. Input contents may be set in various ways. For example, the rear input unit may be used by the user to input a command, such as power on/off, start, end, scroll or the like, adjustment of a volume level output from the audio output modules 152a and 152b, switching the display unit 151 into a touch recognition mode, or the like.

Also, the rear input unit 133 is implemented in a rotatable form. Also, the rear input unit 133 may be provided with the aforementioned touch sensor, or implemented in a form of detecting 'proximity touch.' Also, the rear input unit 133 may include a plurality of keys. In this instance, the plurality of keys may be configured in different shapes to be identified by a user's finger in a tactile manner without rotating the terminal body.

In addition, the rear input unit 133 may include a frame, and a wheel key and a window mounted on the frame, and the like. In this instance, the frame (not illustrated) may be mounted on the case, for example, the rear case 102 of the terminal body. Also, the wheel key (not illustrated) may be mounted on the frame to be exposed to outside of the rear surface through a predetermined through hole. As aforementioned, visual information output on the display unit 151 may change in response to the wheel key being rotated. Also, the window may output relatively simple visual information such as a clock, an alarm, the weather, a status, a notification and the like, and the output visual information may change according to the manipulation of the rear input unit 133.

Also, the rear input unit 133 may be applied to a type of terminal having a display unit and a touch panel provided on both surfaces of a terminal body, respectively. Each display unit may be configured as a transparent display, a stereoscopic display, a flexible display or a combination thereof.

A user interface using the rear input unit 133 disposed on the rear surface of the terminal body is implemented in this specification.

Hereinafter, representative touch operations applied to the rear input unit 133 will be described with reference to FIGS. 3A to 3C.

Figure 3A:
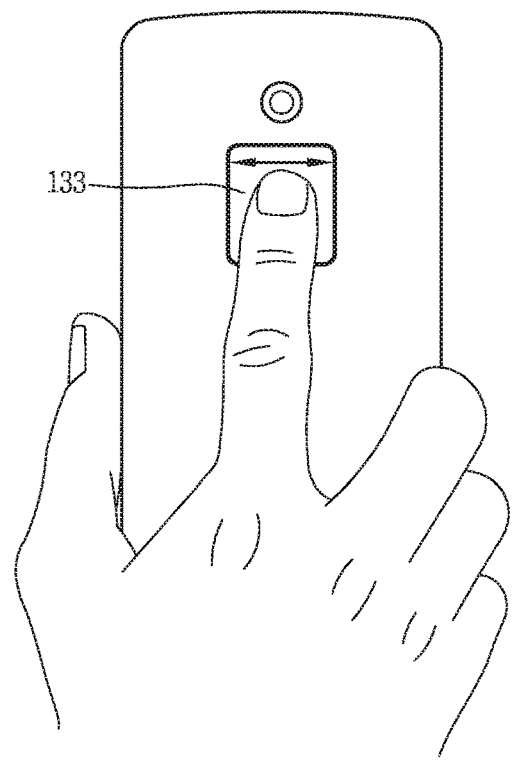
FIGS. 3A to 3C are views each illustrating a representative example of a touch operation applied to a rear input unit, in a mobile terminal according to the present invention.
Figure 3B:
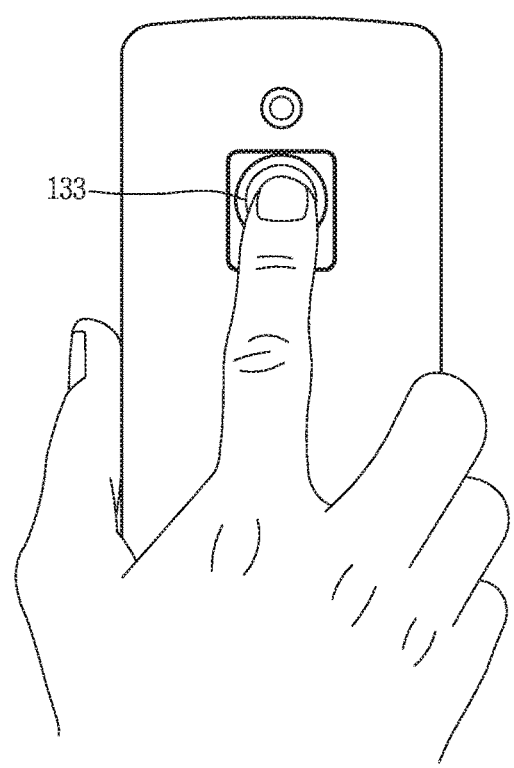
Figure 3C:
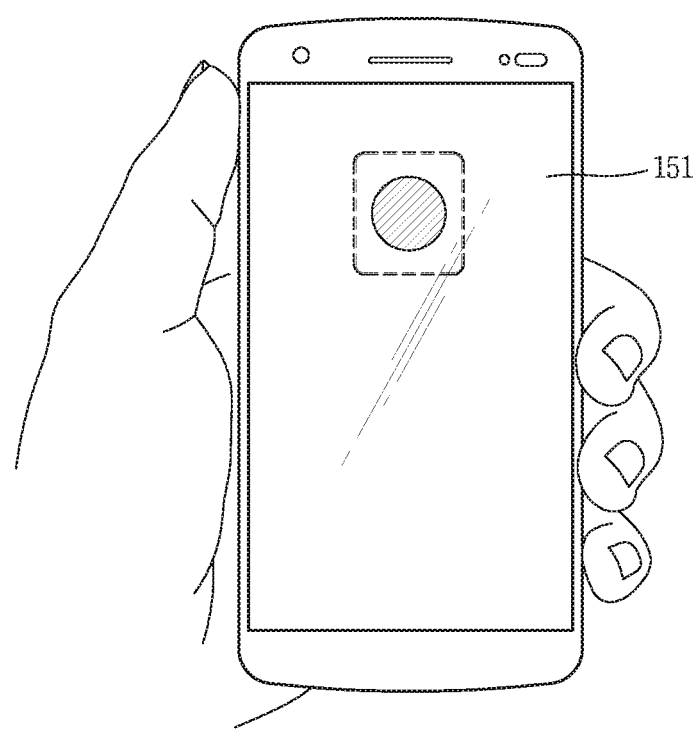

First, as illustrated in FIGS. 3A to 3C, the rear input unit 133 may be provided at a portion which is easily touched by a user's forefinger on the rear surface of the terminal body. In addition, the rear input unit 133 may have a rectangular shape as illustrated in the drawings, but the present invention is not limited thereto. The rear input unit 133 may alternatively have a circular shape, a polygonal shape, or the like, or may be formed in a structure of being recessed into or protruding from a rear frame. In addition, a size of the rear input unit 133 is not limited to the illustrated size. The size of the rear input unit 133 may be smaller than or larger than the illustrated size, and the entire rear frame may be implemented as a touch panel.

FIG. 3A is a representative example of a touch operation for popping up a window of a predetermined size on the display unit 151 disposed on the front surface of the terminal body. The controller of the mobile terminal 100 may pop up a window of a predetermined size on the display unit 151 when a touch input of rubbing the rear input unit 133 to left and right by a predetermined number of times is applied.

FIGS. 3B and 3C are representative examples of a touch operation for maintaining the output state of the window popped up on the display unit 151. As illustrated in the drawings, the output state of the window is maintained when a touch is detected on the rear input unit 133. As described later, when a touch is not detected any more due to a generation of a touch-up event on the rear input unit 133, the window disappears from the display unit 151.

Figure 4C:
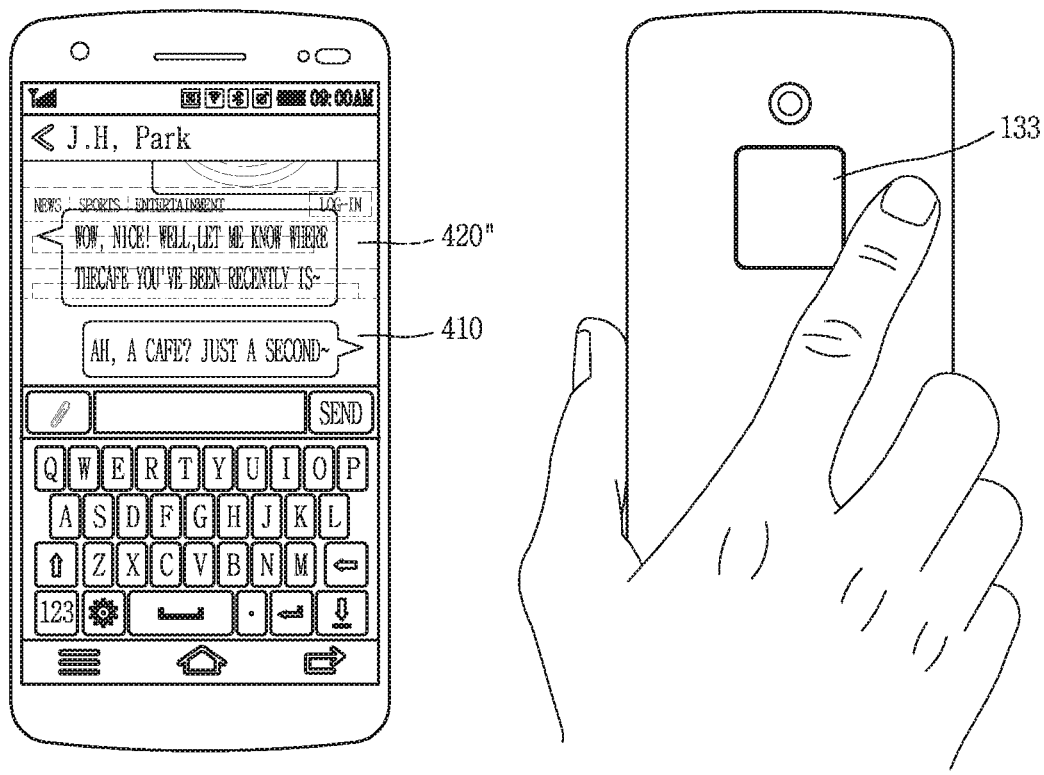

FIGS. 4A to 4C are conceptual views illustrating a method of outputting a window on a front display unit using a touch input applied to a rear input unit in a mobile terminal according to the present invention.

As illustrated in FIG. 4A, the display unit 151 disposed on the front surface of the terminal may output thereon a screen 410 corresponding to an execution of at least one application, for example, a message function application.

At this time, when the user applies a preset touch input to the rear input unit 133 with a hand holding the terminal body, for example, a touch input of rubbing the rear input unit 133 to left and right (or up and down) by a predetermined number of times, the controller 180, as illustrated in FIG. 4B, may pop up the window 420 on one area of the display unit 151.

The window 420 may be popped up on one area of the current screen 410 on the basis of an area of the display unit 151 which corresponds to a position of the rear input unit 133. For example, as illustrated in FIG. 4B, the window 420 may be output on an upper area of the display unit 151 with a predetermined spacing from the uppermost end of the display unit 151. Also, the window 420 is illustrated in a rectangular shape fully filled up to both ends (both sides) of the display unit 151, but may alternatively be implemented in a rectangular shape with a predetermined spacing from each of both sides of the display unit 151.

In addition, the size of the window 420 may be smaller or larger than a size illustrated in FIG. 4B (for example, about ⅕ of the size of the display unit), but is at least smaller than the size of the display unit.

In addition, a boundary line with a predetermined thickness may be output on a boundary region of the window 420, such that the window 420 can be visually distinguished from the screen 410 output on the display unit 151.

In addition, the window 420 may display a part of screen information, which has most recently been output before the screen 410, namely, a chat screen currently output on the display unit 151 is output. For example, while an execution screen of a web application is output, when a message function application is executed according to a manipulation of the terminal, a part of the execution screen of the previously-output web application may be output in the window. At this time, considering the size of the window, only a part of the execution screen of the previously-output web application is displayed in the window, and the part displayed in the window corresponds to a part of the execution screen, which might have been displayed if the execution screen had been output fully on the display unit 151.

Although not illustrated, in order to distinguish a case where a multitasking screen is popped up in response to the front input unit 131 or the display unit 151 being manipulated from a case where the window is popped up in response to the rear input unit 133 being manipulated, as described herein, an icon for notifying that a touch input has been applied to the rear input unit 133 may be output on one area of the window 420 or the display unit 151 or an icon for deleting the window 420 may not be displayed within the window 420.

As such, through the window 420 popped up on the display unit, the user can check an execution screen of another application currently executed on a background or execute a specific function on the execution screen while maintaining a current screen.

Meanwhile, the controller 180 may control the window 420 to be output only while a touch is maintained on the rear input unit 133. In this case, in order to maintain the output state of the window, the aforementioned preset touch input applied to the rear input unit 133 should be continuously detected even after the preset touch input is applied to the rear input unit 133.

In detail, in the popped-up state of the window 420 on the one area of the display unit 151, as illustrated in FIG. 4C, when the touch applied to the rear input unit 133 is released, the controller 180 may control the window 420 to disappear from the display unit 151. In this instance, the window 420 and the screen information displayed in the window 420, as illustrated in FIG. 4C, may gradually fade out, rather than disappearing immediately when the touch is released. That is, as the touch applied to the rear input unit 133 is released, the controller 180 may control the window 420 and the screen information output in the window 420 to disappear after a lapse of a predetermined time while transparency thereof gradually increases.

Meanwhile, although not illustrated, in case of providing a finger scan sensor on the rear input unit 133, when a registered user applies a preset touch input to the rear input unit 133, namely, a touch input of rubbing the rear input unit 133 to left and right/up and down by a predetermined number of times, the controller 180 may pop up the window even in a lock state of the terminal, and display screen information, which has been output before the lock state of the terminal, in the window. At this time, if an object applying the touch to the rear input unit 133 does not match a registered fingerprint, the controller 180 may not output the window or apply a personal information protection function (e.g., outputting a substitute screen or only a partial execution screen of an applications) to the window.

As described above, according to the embodiment of the present invention, a new type of user interface using a user input unit provided on the rear surface of the terminal body can be implemented. Also, a screen of an application which is currently executed in a background can be checked or controlled by using the input unit provided on the rear surface. This may result in allowing effective multitasking.

Hereinafter, FIG. 5 is a representative flowchart illustrating a method of controlling the mobile terminal 100 according to the present invention.

Referring to FIG. 5, first screen information is output on the display unit 151 (see FIG. 1) disposed on the front surface of the terminal (S510). Here, there is no limit in the first screen information output on the display unit 151. For example, the first screen information may be any one of an execution screen of an application, a home screen, and a lock screen corresponding to a lock state of the terminal. In another example, when the display unit 151 is in an inactive state, the step S510 may be omitted and the subsequent step may be performed.

Next, when a preset touch input is received on the rear input unit 133 (see FIG. 1) disposed on the rear surface of the terminal (S520), the controller 180 (see FIG. 1) may output the window on one area (or a designated area) of the first screen information while the touch applied to the rear input unit 133 is detected (S530).

Here, the preset touch input may be an input which is applied to the rear input unit 133 and then dragged to left and right/up and down by a predetermined number of times. For example, when an initial touch applied to the rear input unit 133 is dragged from left to right/right to left more than once based on an initially-applied point of the touch, the controller 180 may pop up the window on one area of the display unit 151.

In addition, a part of second screen information which was output on the display unit 151 before the output of the first screen information may be displayed in the window.

At this time, when there is no other screen information that has been output before the first screen information is output, the second screen information may be a part of a home screen. When there is no other screen information that has been output before the output of the first screen information and the first screen information is the home screen, the second screen information may be a part of an application tray screen. In another example, when a predetermined touch input is received on the rear input unit 133 in the inactive state of the display unit 151, only one area of the display unit 151 may be activated to output the window, and the remaining area of the display unit 151 may be maintained in the inactive state.

The window may be output in a manner of overlapping at least part of the first screen information output on the display unit 151. The window is displayed with a boundary line having a predetermined thickness or with a different background image so as to be visually distinguished from the first screen information.

On the other hand, when any touch is not detected any more on the rear input unit 133, that is, when a touch-up event is generated on the rear input unit 133, the controller 180 may control the window and the second screen information displayed in the window to gradually disappear.

Here, that the window and the second screen information displayed in the windows gradually disappear refers to that transparencies of a boundary area of the window and text, image, line, color or the like displayed in the window gradually increase and then the window completely disappears from the display unit 151 after a lapse of a reference time. A part of the first screen information that has been obscured by the window appears on the area where the window disappears.

In another example, when a touch-up event is generated on the rear input unit 133, the controller 180 may control the window to disappear with applying an animation effect (flickering, flying, brightness change, bounce, rotation, wiping, solid line).

As such, the touch applied to the rear input unit 133 is a condition for popping up the window, and also a condition for maintaining the popped-up state of the window. Accordingly, the user can check another task or execute a desired function on the temporarily popped-up window while continuously viewing a current screen. In addition, the popped-up window is closed merely by removing a touch object from the rear input unit 133. This may prevent the screen information currently output on the display unit 151 from being obscured or minimize an error of an operation for closing the window.

Meanwhile, when a touch-down event is generated on the rear input unit 133 within the reference time after the window disappears, the controller 180 may control the disappeared window and second screen information output in the window to appear again. Even in this case, the same or similar effects as those when the window and the second screen information displayed in the window disappear can be applied as well.

Hereinafter, FIGS. 6A to 6E illustrate an example of a method of adjusting a size or position of a window using a touch input applied to the rear input unit 133 in the mobile terminal 100 disclosed in the present specification.

Figure 6A:
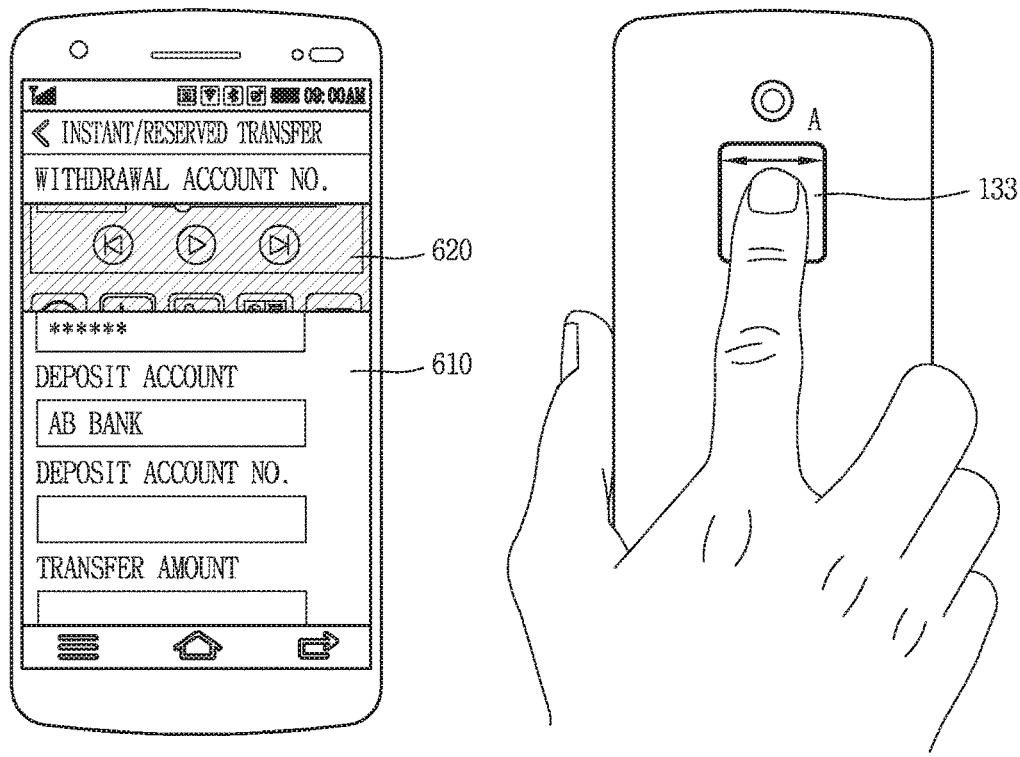
FIGS. 6A to 6E are conceptual views illustrating a method of adjusting a size or position of a window using a touch input applied to a rear input unit, in a mobile terminal according to the present invention.
Figure 6B:
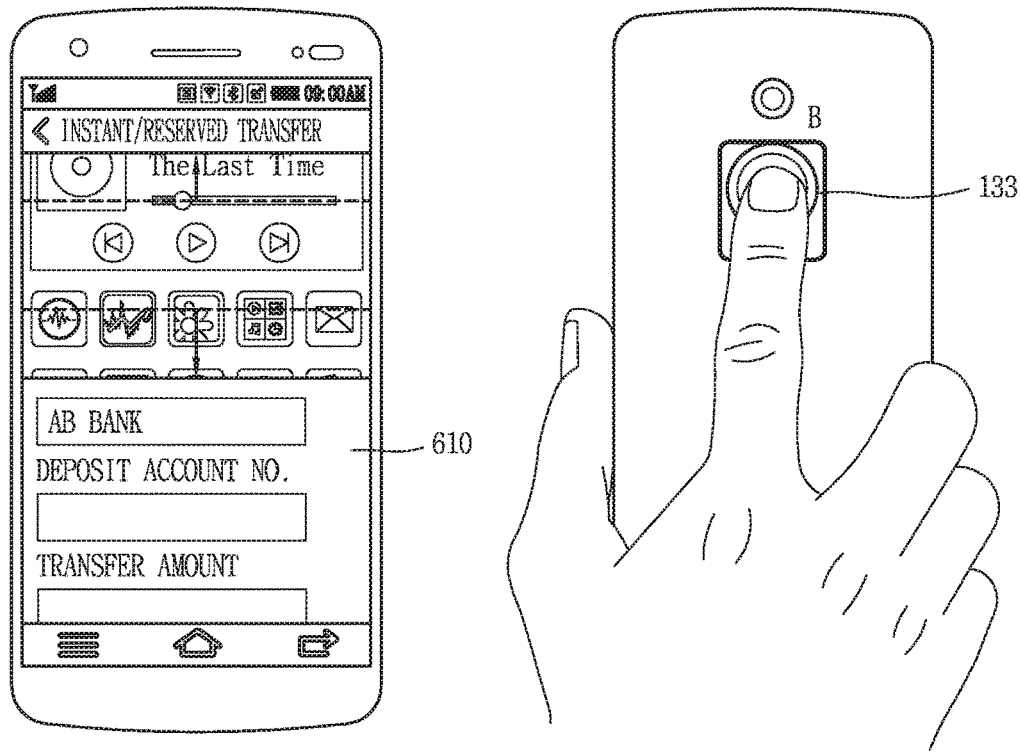
Figure 6C:
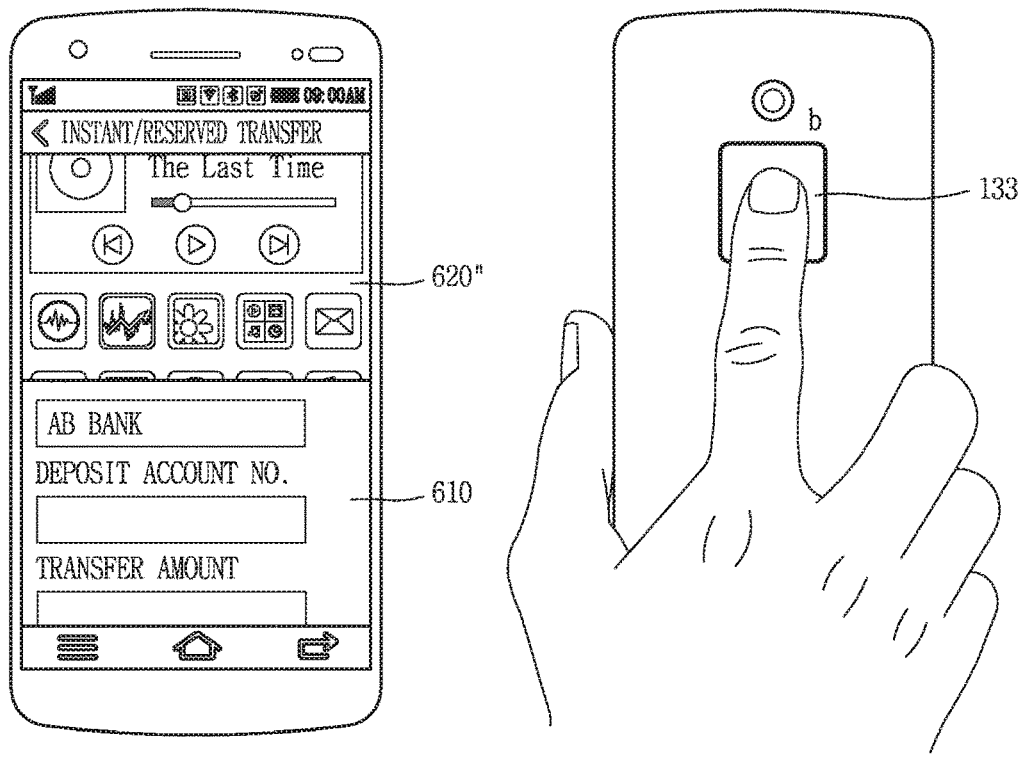

First, FIGS. 6A to 6C illustrate a method of adjusting the size of the window using a touch input applied to the rear input unit 133.

In a state that a home screen is output on the display unit 151 of the terminal, a screen corresponding to an execution of a financial function application is output. In this state, as illustrated in FIG. 6A, when a preset touch input A is applied to the rear input unit 133, namely, a touch input of rubbing the rear input unit 133 from left and right or right to left by a predetermined number of times (e.g., once), a window 620 is popped up on an area of the display unit 151 corresponding to the position of the rear input unit 133.

At this time, the window 620 may output thereon a part of the home screen that has been output on the display unit 151 before the screen 610 corresponding to the execution of the financial function application is output.

The controller 180 may control the window 620 to be output only while a touch is detected on the rear input unit 133. In this case, an image object (for example, a shape of the rear input unit 133) indicating that the touch is currently detected on the rear input unit 133 may be output on one area, for example, a lower area of the display unit 151.

In addition, the controller 180 may output the window 620 in a different size according to pressure strength of a touch input applied to the rear input unit 133 in a perpendicular direction. Specifically, the controller 180 may increase the size of the window as the pressure strength of the touch applied to the rear input unit 133 increases after the window is popped up on a predetermined area. At this time, the increased size of the window may be proportional to the pressure strength of the touch applied to the rear input unit 133. For example, as illustrated in FIG. 6B, when pressure of a touch applied to the rear input unit 133 is increased (B), the window 620 may extend up and down to correspond to the increased pressure. On the other hand, when the window has a rectangular shape with a predetermined spacing from each of both sides of the display unit 151, the window 620 may also extend up and down and to left and right in response to an increase in pressure of a touch applied to the rear input unit 133.

When an image object indicating that a touch is currently detected on the rear input unit 133 is output on the display unit 151, the controller 180 may change a size or shape of the image object according to a change in pressure of the touch applied to the rear input unit 133.

As such, when the window 620 extends in size, the controller 180 may control the extended window 620" to be maintained, as illustrated in FIG. 6C, even if the pressure of the touch applied to the rear input unit 133 is reduced (b).

In another example, when pressure of a touch applied by a touch object (e.g., a finger, a stylus pen, etc.) to the rear input unit 133 is decreased within a predetermined time, the controller 180 may control the extended window 620" to be reduced in size again. On the other hand, when the pressure of the touch is maintained until the predetermined time elapses, the controller 180 may control the extended window 620" to be maintained in the extended size.

In addition, although not illustrated, the controller 180 may decide a surface of the window 620 which extends in size, according to a pivot gesture centering on a point of the rear input unit 133 to which a touch is applied. For example, in case where a touch object applying a touch to the rear input unit 133 is a finger, when the touch is applied by pressing the rear input unit 133 with the whole finger, upper and lower surfaces/upper, lower, left and right surfaces of the window 620 may evenly extend. On the other hand, when the touch is applied to the rear input unit 133 with pivoting the finger upward, the upper surface of the window 620 may extend.

Figure 6D:
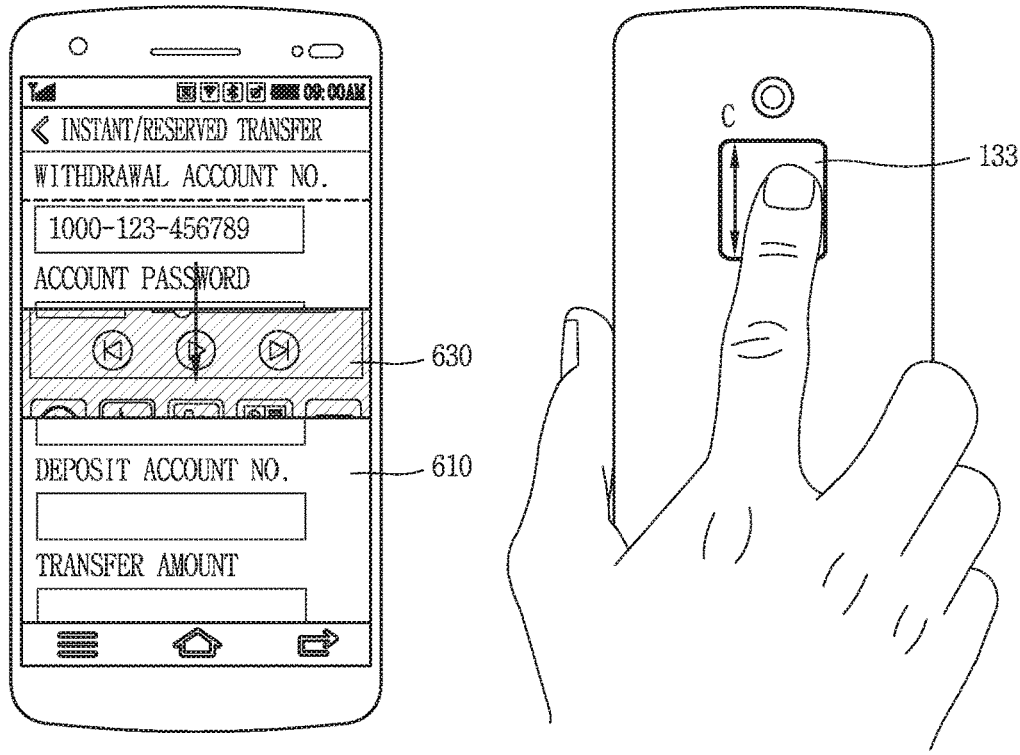
Figure 6E:
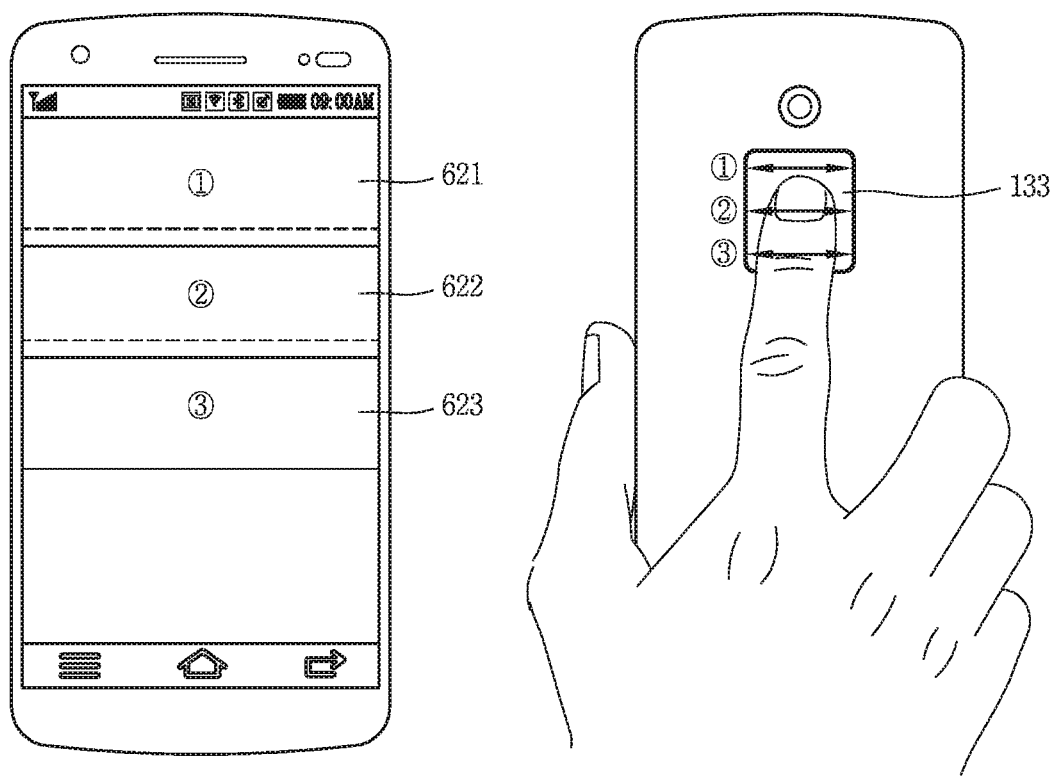

Next, FIGS. 6D and 6E are exemplary views illustrating a method of adjusting an output position of a window using a touch input applied to the rear input unit 133.

The controller 180 may change an output position of a window as a touch applied to the rear input unit 133 of the terminal is moved up and down in a state where the window is output on the display unit 151.

For example, in a state where a window is popped up on one area of the display unit 151, as illustrated in FIG. 6D, when a drag input is applied to the rear input unit 133 in a downward direction (C), the controller 180 may move the popped-up window downward to correspond to the drag input (630). At this time, a moved distance of the window further increases, in response to increasing a number of times that the touch input is dragged in the same direction (e.g., downward) on the rear input unit 133.

When a plurality of drag inputs are applied to the rear input unit 133, the controller 180 may control the movement of the window to be continuously indicated and screen information output in the window to repetitively fade in and out, according to a touch-up event which is generated between the drag inputs.

When the rear input unit 133 is implemented to have a size more than a predetermined size, the controller 180 may output a window on a portion of the display unit 151, which corresponds to a point where a touch has been initially applied to the rear input unit 133.

For example, as illustrated in FIG. 6E, when a preset touch input is applied to an upper area (α) of the rear input unit 133, a window may be popped up on an upper area of the display unit 151 (621). When the preset touch input is applied to a central area (α2) of the rear input unit 133, the window may be popped up on a central area of the display unit 151 (622). On the other hand, when the preset touch input is applied to a lower area (α3) of the rear input unit 133, the window may be popped up on a lower area of the display unit 151 (623).

Figure 7A:
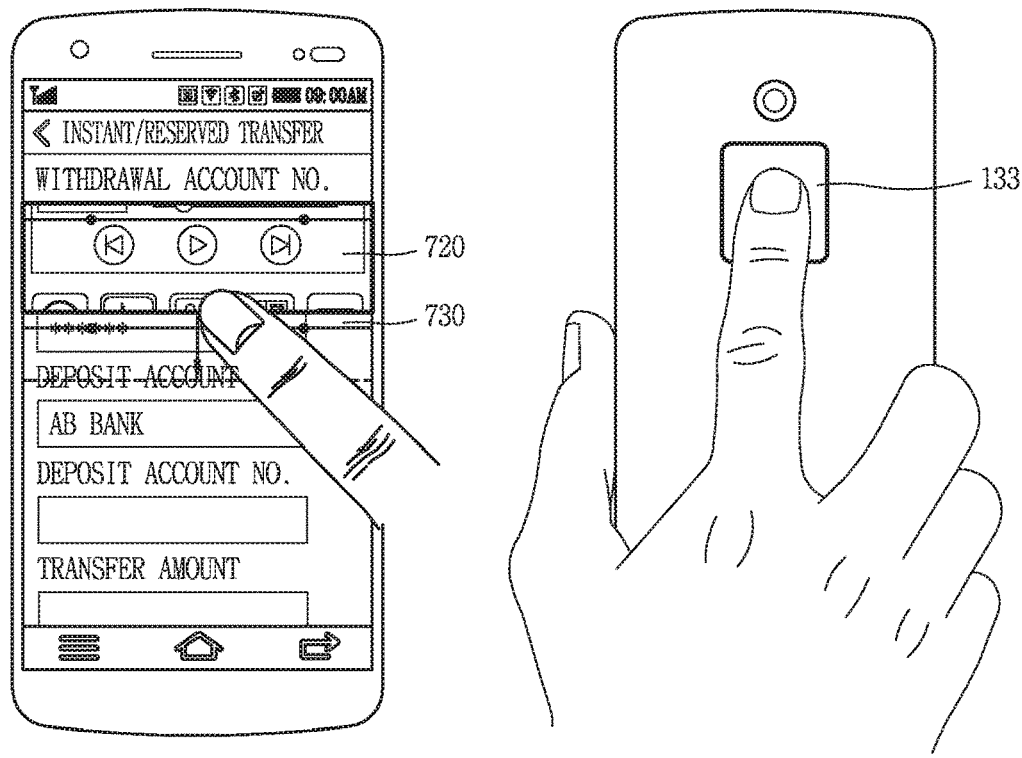
FIGS. 7A and 7B are conceptual views illustrating a method of adjusting a size or position of a window using a touch input applied to a display unit, in a mobile terminal according to the present invention.
Figure 7B:
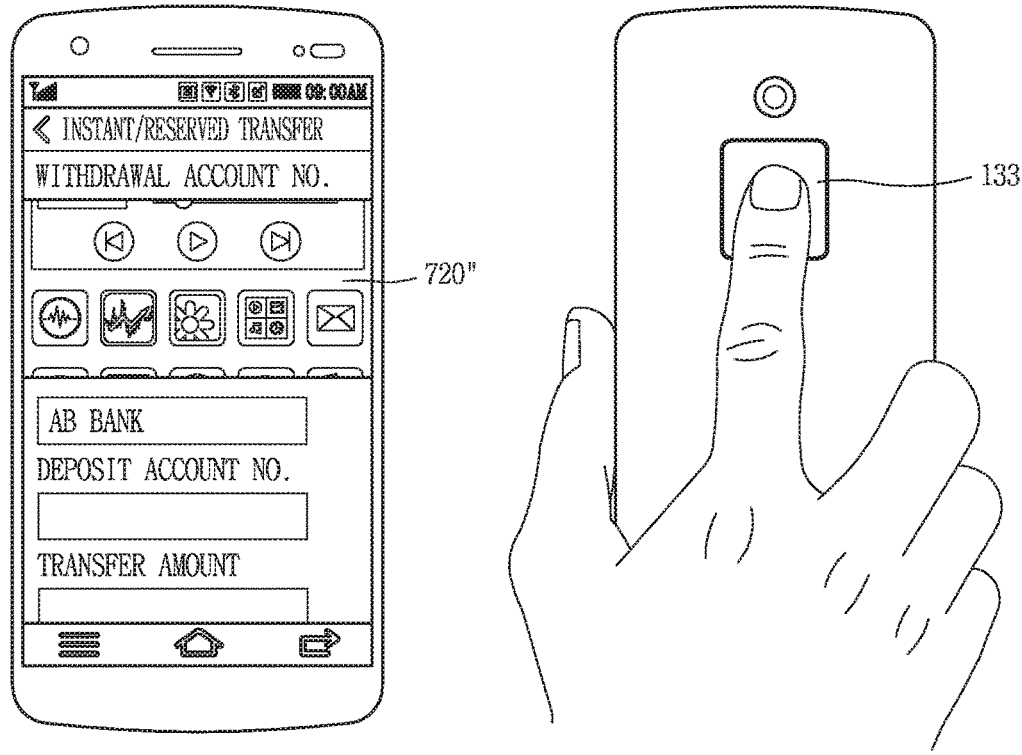

Meanwhile, a size or position of a window may be adjusted through a touch input applied to the display unit 151. FIGS. 7A and 7B are exemplary views illustrating a method of adjusting a size or position of a window using a touch input to the display unit.

To this end, the display unit 151 disposed on the front surface of the terminal is configured to detect a touch input.

In a state where a window is popped up on the display unit 151 in response to a preset touch input (e.g., a touch input of rubbing the rear input unit 133 to left and right by a predetermined number of times) being applied to the rear input unit 133 of the terminal, when a touch is applied to a boundary area of the popped-up window, the controller 180 may output a handler on the boundary area of the window. As illustrated in FIG. 7A, the handler may indicate that a boundary line is output along the boundary area of the window and also circular images are output on the boundary line at a predetermined interval.

As a touch applied to the handler is dragged, the controller 180 may change the size or position of the window. Even during this, a touch applied to the rear input unit 133 should be maintained.

For example, as illustrated in FIG. 7A, while a touch is applied to the rear input unit 122, when a boundary area of a popped-up window 720 is touched long with a finger, a handler 730 is output on the boundary area of the window 720. When the handler 730 is pulled in a desired direction, for example, in a downward direction, as illustrated in FIG. 7B, a window 720" extended downward is output. When the touch is released from the handler 730, the extended window 720" is fixed.

Although not illustrated, in the output state of the handler 730, when a touch applied to an inside of the window, other than the boundary area of the window, is dragged in one direction within a predetermined time, a position of the window may be moved. When the touch applied to the inside of the window is released, the output handler disappears and the window is fixed to the moved position.

Hereinafter, a detailed method of controlling a screen output on a popped-up window or controlling a current screen using the popped-up window will be described.

FIGS. 8A and 8B and FIGS. 9A and 9B are conceptual views illustrating a method of controlling screen information displayed on a window in a mobile terminal according to the present invention.

The display unit 151 of the mobile terminal 100 disclosed herein may be configured to detect a touch input and the controller 180 may recognize through the sensing unit 140 whether a touch input applied to the display unit 151 has been detected on originally-output first screen information or within a popped-up window.

Meanwhile, the reason why the window popped up through the touch input to the rear input unit 133 is displayed only while the touch is detected on the rear input unit 133 is to use for controlling the first screen information by treating the first screen information as a main screen or the second screen information displayed in the window as a sub screen. Therefore, when the user desires to view a part of the first screen information obscured by the popped-up window, the user should be able to immediately confirm the partial information even while the touch to the rear input unit 133 is maintained.

Accordingly, in a state where the window is popped up on the front display unit 151 in response to a reception of a preset touch input on the rear input unit 133, when a touch input from a point outside the window is moved into the window, the controller may control at least part of the second screen information displayed in the window to disappear along a trajectory of the touch. Therefore, a portion of the first screen information obscured by the disappeared second screen information may be visible.

Figure 8A:
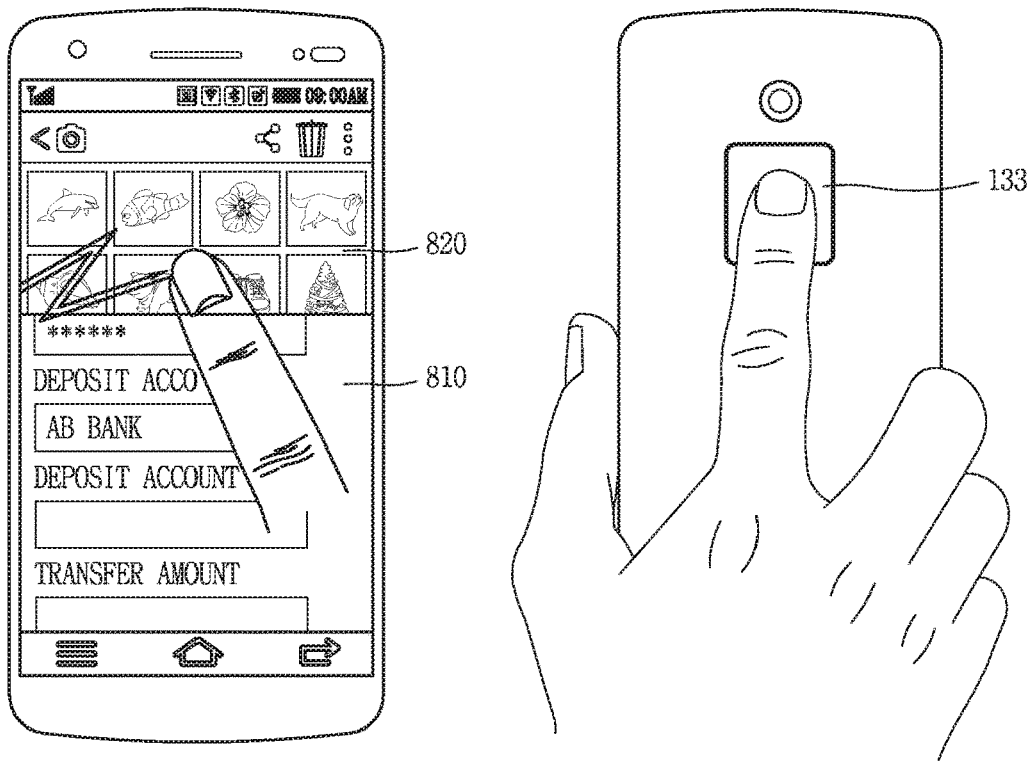
FIGS. 8A, 8B, 9A and 9B are conceptual views illustrating a method of controlling screen information output on a window, in a mobile terminal according to the present invention.
Figure 8B:
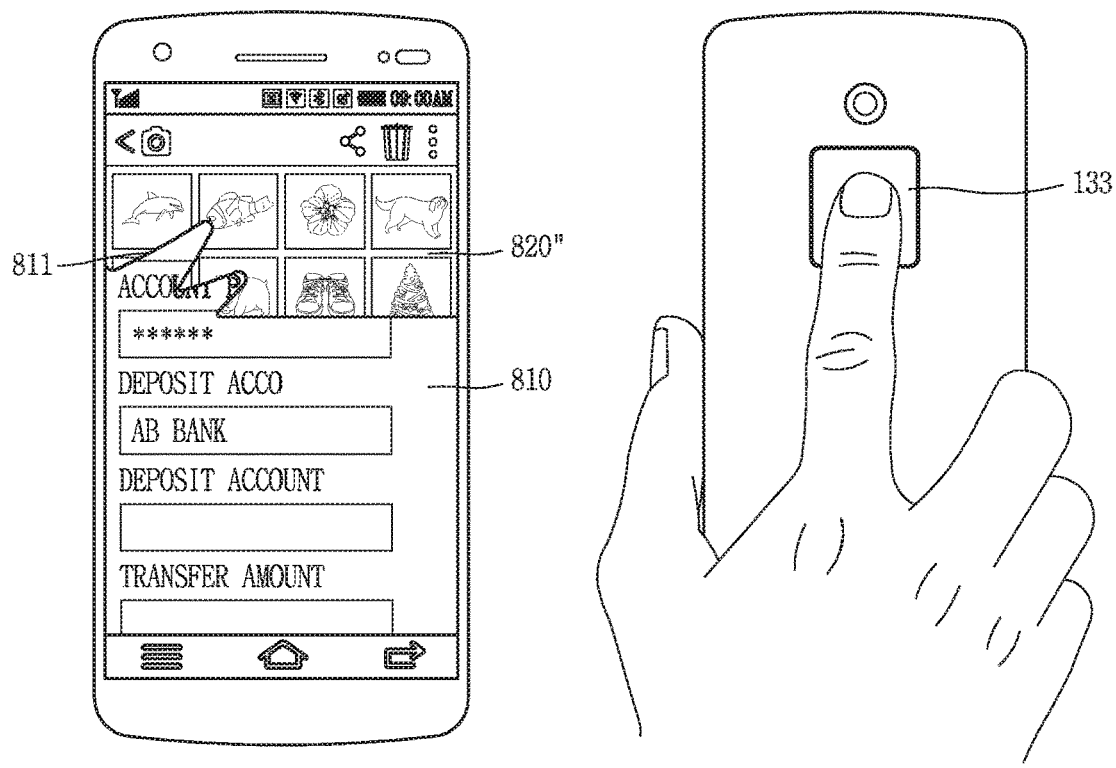

For example, as illustrated in FIG. 8A, in a state where a window 820 is popped up in one area of first screen information 810 on the display unit 151 and a touch to the rear input unit 133 is maintained, when the user applies a drag input that a touch started from an output area of the first screen information 810 is dragged to a window area and rubs the window area, a part of second screen information output in the window 820, for example, several picture images 10 are erased. And, as illustrated in FIG. 8B, an obscured portion of the first screen information, for example, an account number input area 811 is displayed on the erased portion.

At this time, since the touch input to the rear input unit 133 is still maintained, the popped-up window is continuously output, and the displayed contents are divided into a first part 811 corresponding to the first screen information, and a second part 820" corresponding to a portion of the second screen information.

On the other hand, since the screen information displayed in the popped-up window is a part of the second screen information that was previously output on the display unit 151, when the user wants to check or use another part of the second screen information, the user may apply a drag input within the window to output the another part of the second screen information.

Figure 9A:
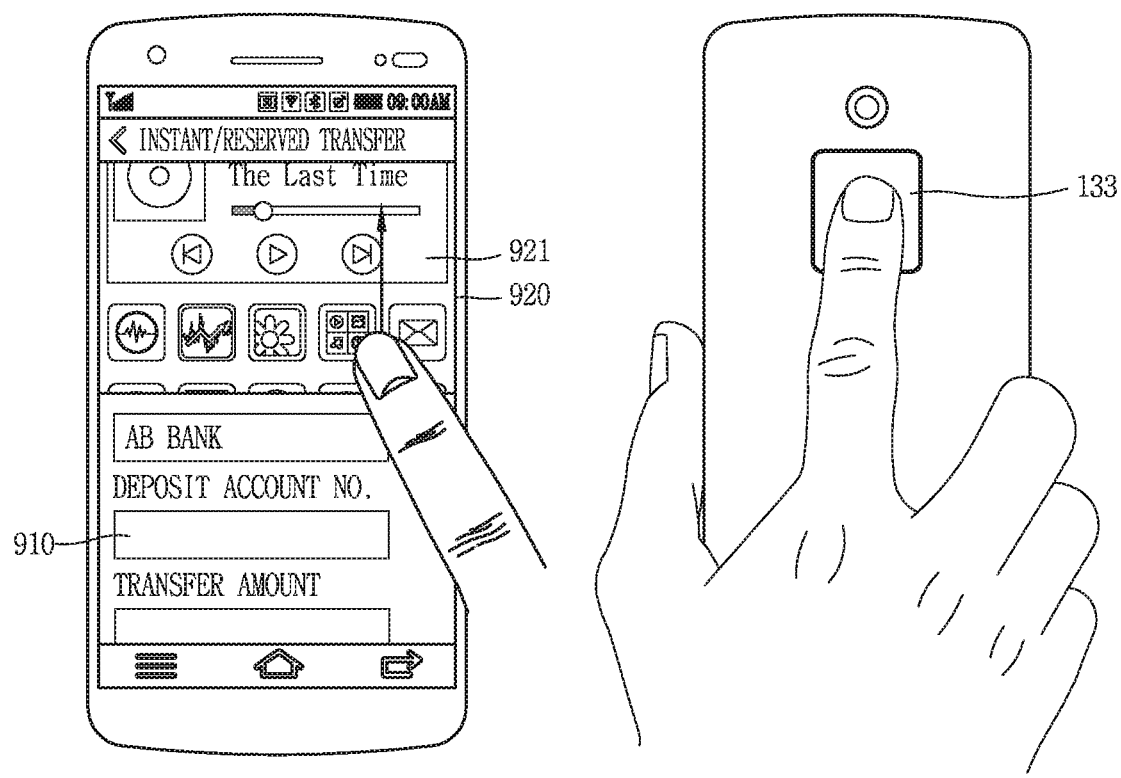
Figure 9B:
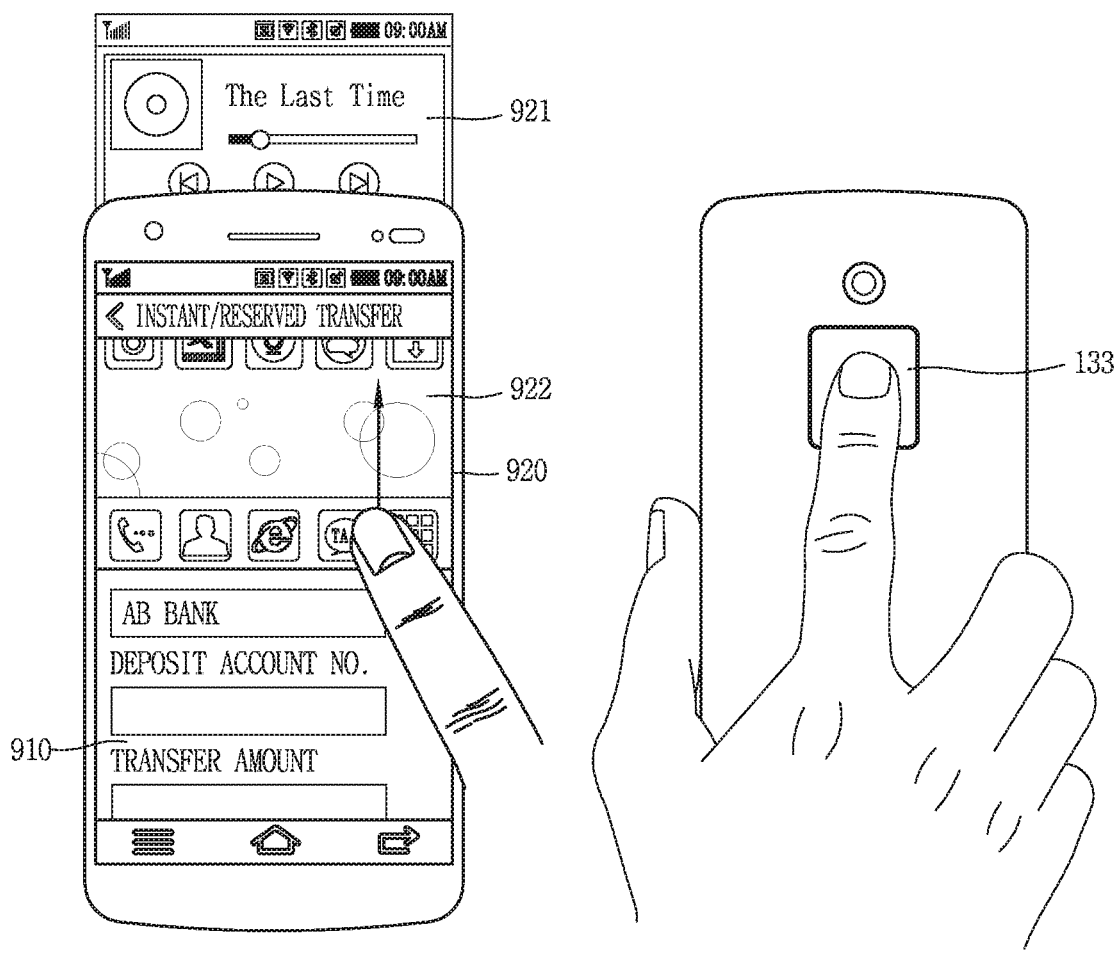

For example, as illustrated in FIG. 9A, when a drag input is applied within a popped-up window 920 in one direction (e.g., upward) while a touch to the rear input unit 133 is maintained, the controller 180, as illustrated in FIG. 9B, may move a first area 921 displayed within the window 920 upward along the drag input and display a second area 922 on a position where the first region was displayed. That is, a screen displayed within the window 920 is moved along the drag input. At this time, when one boundary area of the second screen information is output in the window 920 and there is no area to be moved along the drag input, a bounce effect that the screen is bounced opposite to the drag input may be applied.

As such, when a touch applied to the rear input unit 133 is released after a position of a screen is adjusted, a popped-up window disappears. When a touch-down event is detected again on the rear input unit 133 within a reference time, the controller 180 may output a screen displayed just before the popped-up window disappears, namely, a window in which another portion of the position-adjusted second screen information is displayed may be output.

Figure 10A:
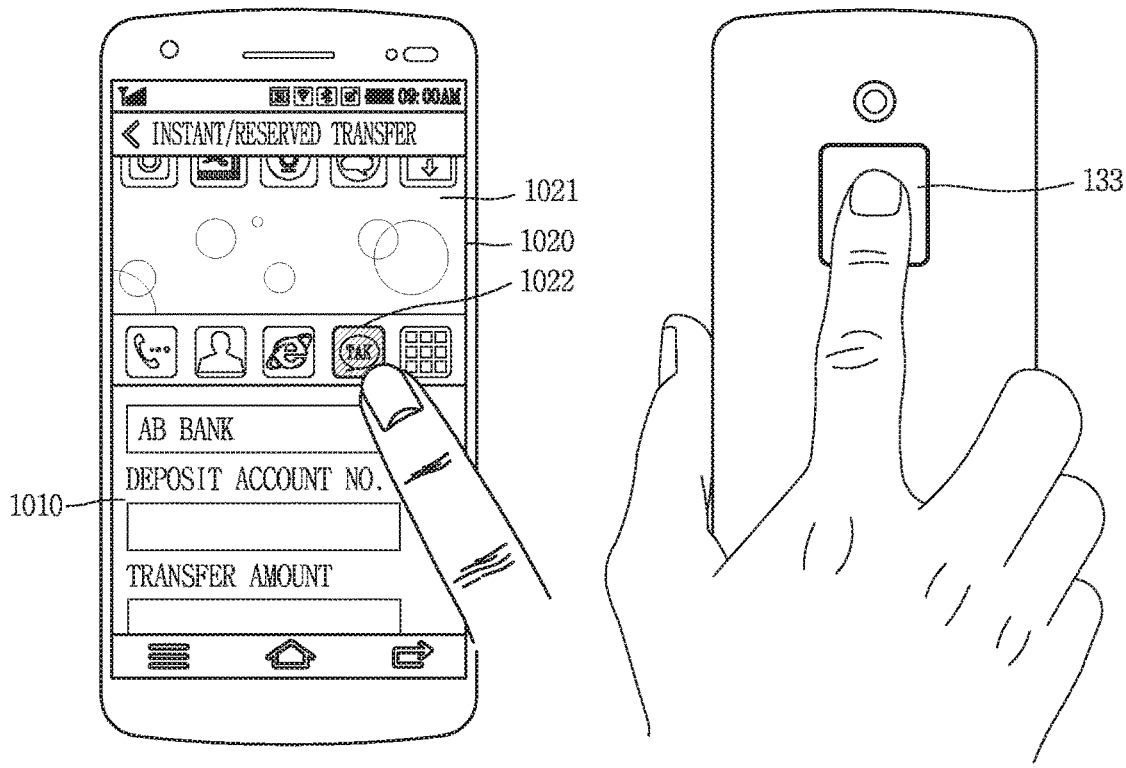
FIGS. 10A to 10C are conceptual views illustrating a method of controlling screen information output on each of a window and a foreground, in a mobile terminal according to the present invention.
Figure 10B:
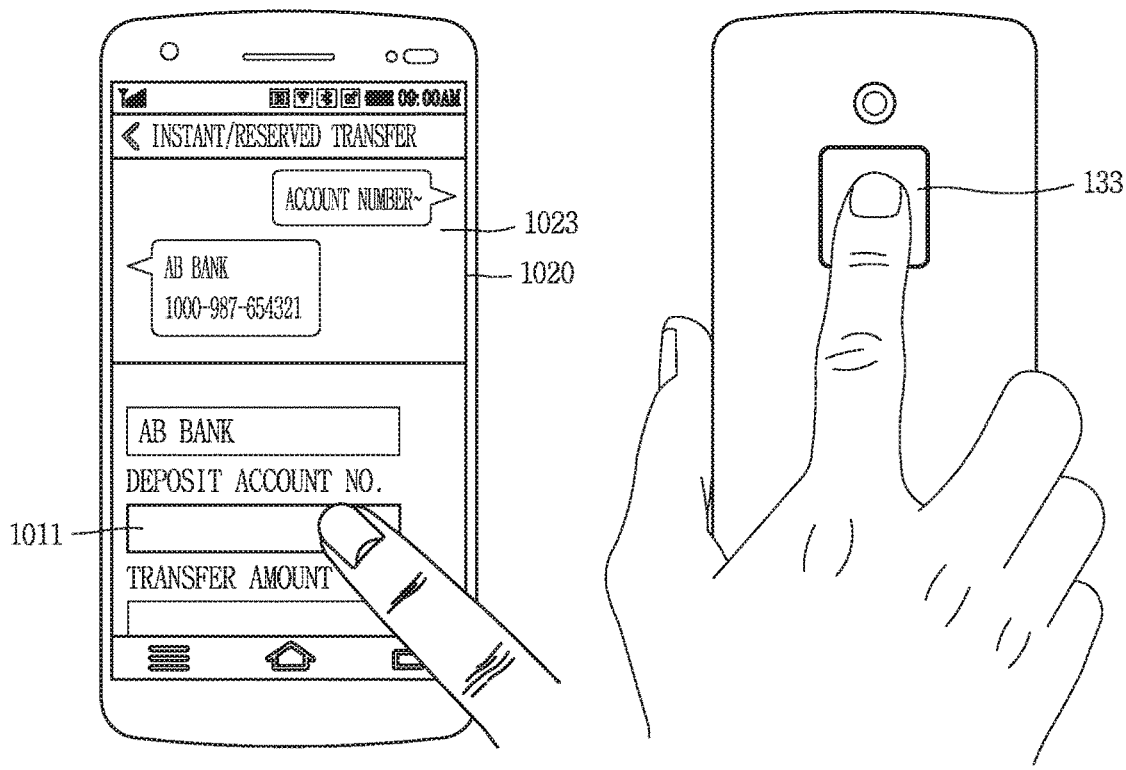
Figure 10C:
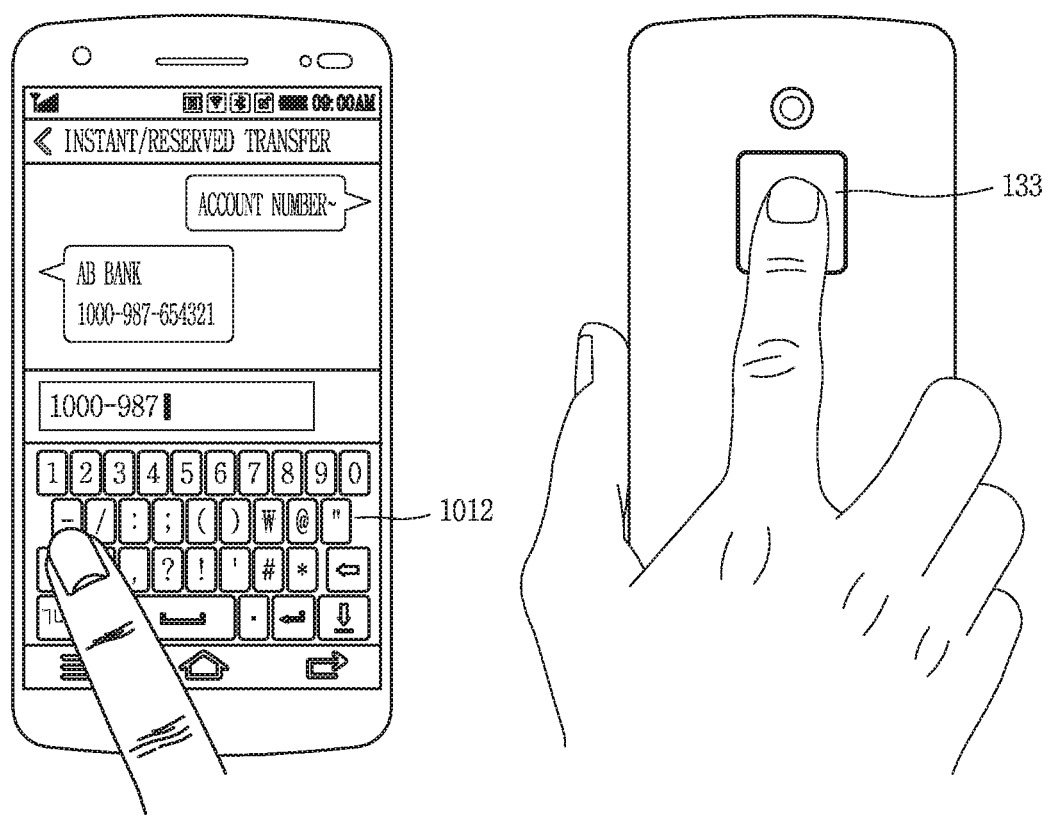

Hereinafter, FIGS. 10A to 10C illustrate a method of controlling screen information displayed on a window and a foreground, respectively, in a mobile terminal according to the present invention.

For example, when desiring to perform a credit transfer to a specific person by executing a financial function application on the mobile terminal 100, if it is necessary to check a screen of another application for inputting an account number of the specific person, in the related art, a current screen should be switched into an execution screen of the another application for executing the another application or a home screen should first be accessed to enter the another application. In addition, several steps, such as manipulating the terminal, should be inconveniently performed in order to return to the previous screen after checking (or copying) the account number of the specific person.

On the other hand, the present invention may allow desired information to be searched through a popped-up window using a touch input applied to the rear input unit 133 while a current state of a screen is maintained.

To this end, when a touch input is applied to the display unit 151 within a window in a state where the window is popped up on one area of the display unit 151 in response to a reception of a preset touch input on the rear input unit 133, the controller 180 may control a control command by the touch input to be executed within the window. On the other hand, when a touch input is applied to the display unit 151 outside the window, the controller 180 may control the control command by the touch input to be executed in an output area of the first screen information.

That is, a screen displayed in the window is opened in a background, and a screen displayed in an area outside the window is opened in a foreground. However, each screen control may be executed based on a touch point with respect to the display unit 151.

For example, as illustrated in FIG. 10A, when an account number of a counterpart for a transfer is included in messages exchanged in a message function application, as a preset touch input is applied to the rear input unit 133 with outputting screen information 1010 for the transfer, a window 1020 in which a part of a home screen is displayed may be popped up.

When a message function application icon 1021 is selected in the window 1020 which has been popped up in a manner of overlapping a part of the screen information 1010 for the transfer, the controller 180 executes the application corresponding to the selected icon 1021 and outputs a portion 1023 of a chat screen in the window 1020. When the desired account information is not present in the portion 1023 of the displayed chat screen, as aforementioned, the controller 180 may adjust a screen position by applying a drag input within the window 1020.

When desired information is displayed, if a touch is applied to an area of the first screen information outside the window, as illustrated in FIG. 10C, the controller 180 may output a virtual keyboard 1012 for inputting the account number on one area, for example, a lower area, of the display unit 151.

Meanwhile, although not illustrated, when another window (e.g., virtual keyboard) is popped up or the first screen information is switched into third screen information in response to an execution of a control command corresponding to a touch input applied to an area of the display unit 151 outside the window, the controller 180 may continuously maintain an output position and an output state of the window. For example, when another window is to be popped up on a top of the display unit 151 according to a control command executed in the first screen information, the controller 180 may pop up the another window on another area or output a message on an area out of the window to notify that the another window has been popped up on the top of the display unit 151.

That is, since the popped-up window disappears when the touch input applied to the rear input unit 133 is released, if the user intentionally continues the touch with respect to the rear input unit 133, it is recognized that the user wants to keep using the window and thus the window is popped up on the uppermost layer.

Meanwhile, even if the second screen information output just before the first screen information is output is one, a plurality of tasks corresponding to a plurality of applications may be executed in a background.

FIGS. 11A to 11E illustrate an example of a method of switching a task output on a window into another task executed in a background by using a touch input applied to a rear input unit in a mobile terminal according to the present invention.

In case where a window is popped up on one area of the display unit 151 in response to a reception of a preset touch input applied to the rear input unit 133, when a task which has been output on the display unit before first screen information is output is in plurality, the controller 180 may output in the window screen information corresponding to any one of the plurality of tasks. At this time, the one task, as aforementioned, is generally screen information which has been output just before the first screen information is output on the display unit 151. However, if necessary, a different task, such as a task with the longest task time, a task with high user preference, a task in which an event occurs, or the like, among the plurality of tasks, may preferentially be displayed according to a predetermined criterion.

In this case, the window may output thereon an icon for notifying another task which has not been displayed, for example, an icon of an application corresponding to the another task.

For example, when tasks A, B, C and D are executed in the order of D, C, B, and A in the mobile terminal 100, screen information corresponding to the task A is currently displayed on the display unit 151.

Figure 11A:
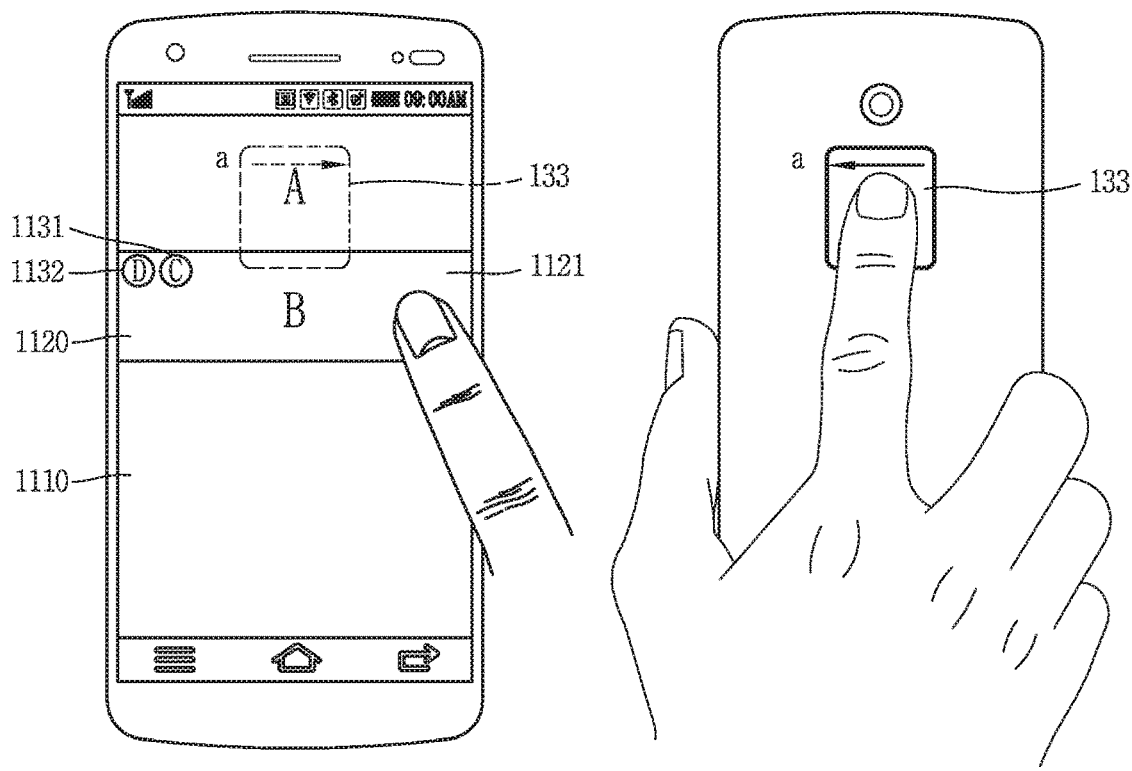
FIGS. 11A to 11E are conceptual views illustrating a method of switching a task output on a window into another task, using a touch input applied to a rear input unit, in a mobile terminal according to the present invention.

In this state, when a preset touch input is applied to the rear input unit 133, for example, a touch input for rubbing the rear input unit 133 to left and right/up an down by a predetermined number of times, as illustrated in FIG. 11A, a window 1120 is popped up on one area of a screen A 133 in an overlapping manner. A part of a screen B which was output before the execution of the task A is output in the window 1120, and icons 1132 and 1131 corresponding to the tasks D and C which were executed earlier than the task A are output on an upper left area of the window 1120. At this time, the icon 1131 of the task C that was executed just before the task B is displayed closer to a center of the window 1120, and the icon 1132 of the task D that was executed earlier is displayed farther from the center of the window 1120. Accordingly, this may allow the user to recognize that a part of a screen C can be output after the part 1121 of the screen B.

In this state, when a touch input is applied to the rear input unit 133 in one direction, for example, from left to right with respect to the display unit 151 (or from right to left with respect to the rear input unit 133) (a), the controller 180 may switch screen information corresponding to one of the tasks displayed in the window into screen information corresponding to another task corresponding to the touch input.

Figure 11B:
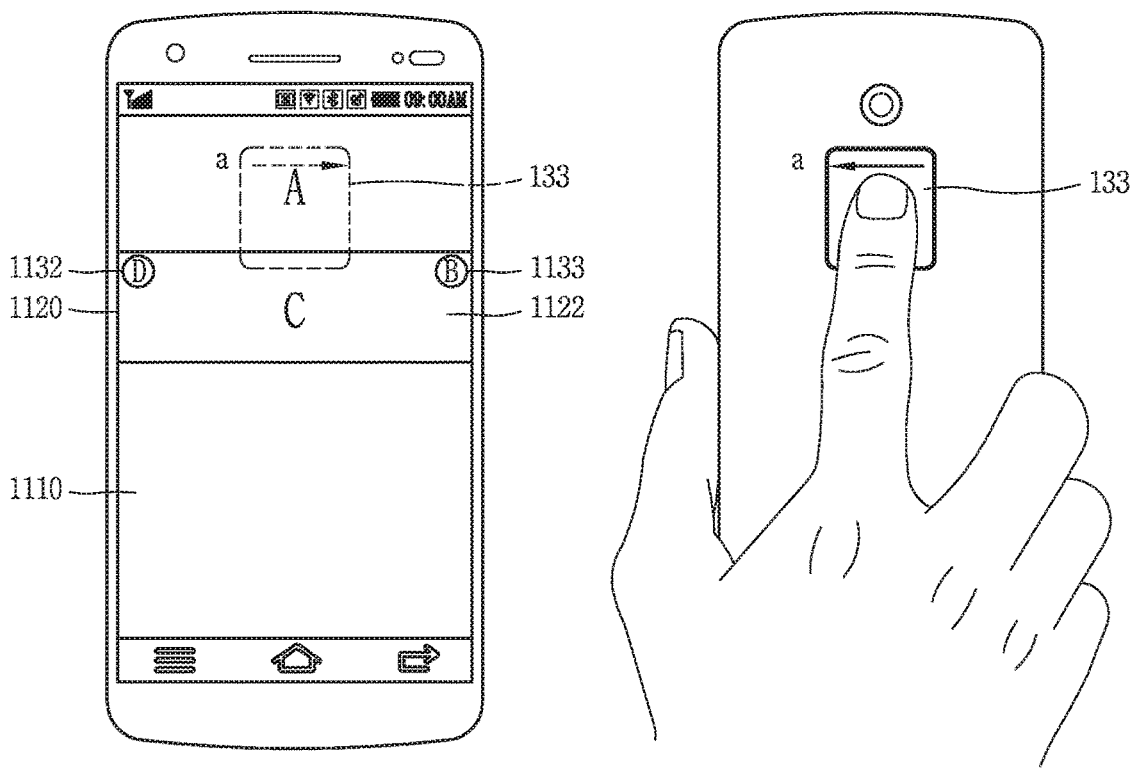
Figure 11C:
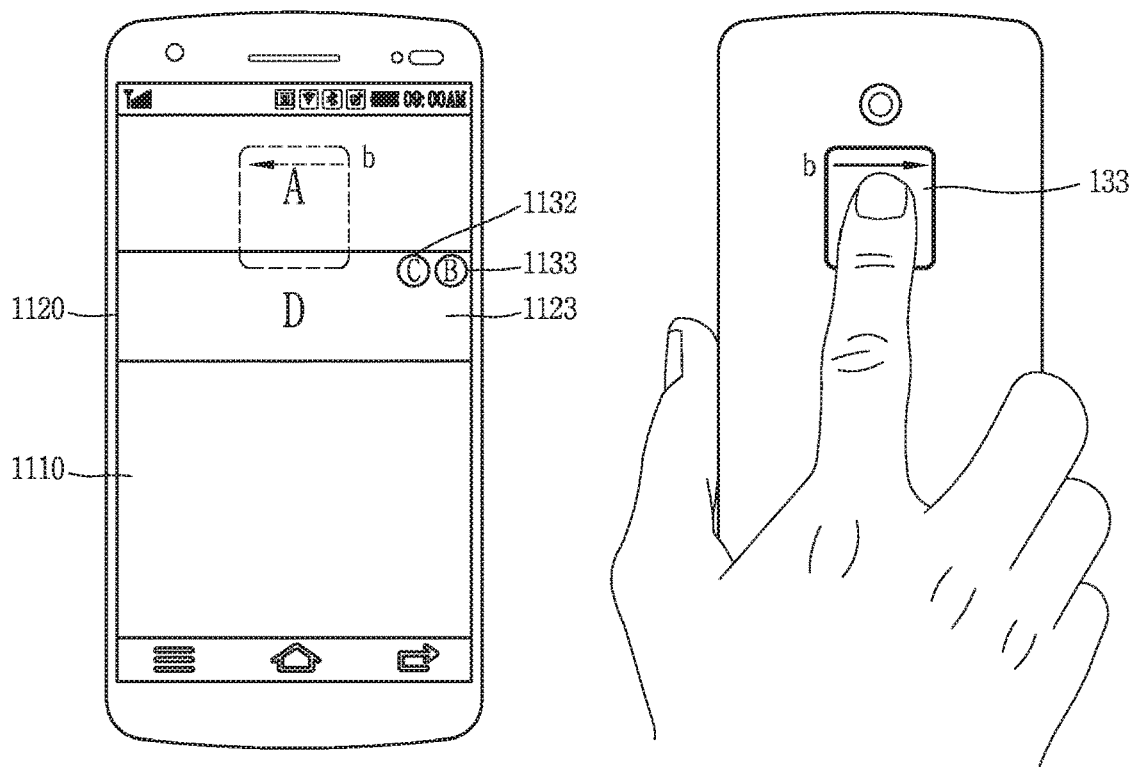

For example, as illustrated in FIG. 11A, as a slide or drag input is applied to the rear input unit 133 in a direction a, the part 1121 of the screen B displayed in the window 1120 is switched into a part 1122 of the screen C, as illustrated in FIG. 11C. At this time, the output state of the screen A 1110 that has been output in the area outside the window 1120 is maintained. An icon 1133 corresponding to a part of the screen B displayed in the window 1120 is generated and displayed on an upper right side of the window.

That is, when the screen information (for example, the part of the screen B) displayed in the window is switched into screen information (for example, the part of the screen C) corresponding to another task, the controller 180 may control an icon notifying the screen information (e.g., the part of the screen B), which was previously output in the window, to be output at a position corresponding to the direction that the touch input is applied to the rear input unit 133.

Figure 11D:
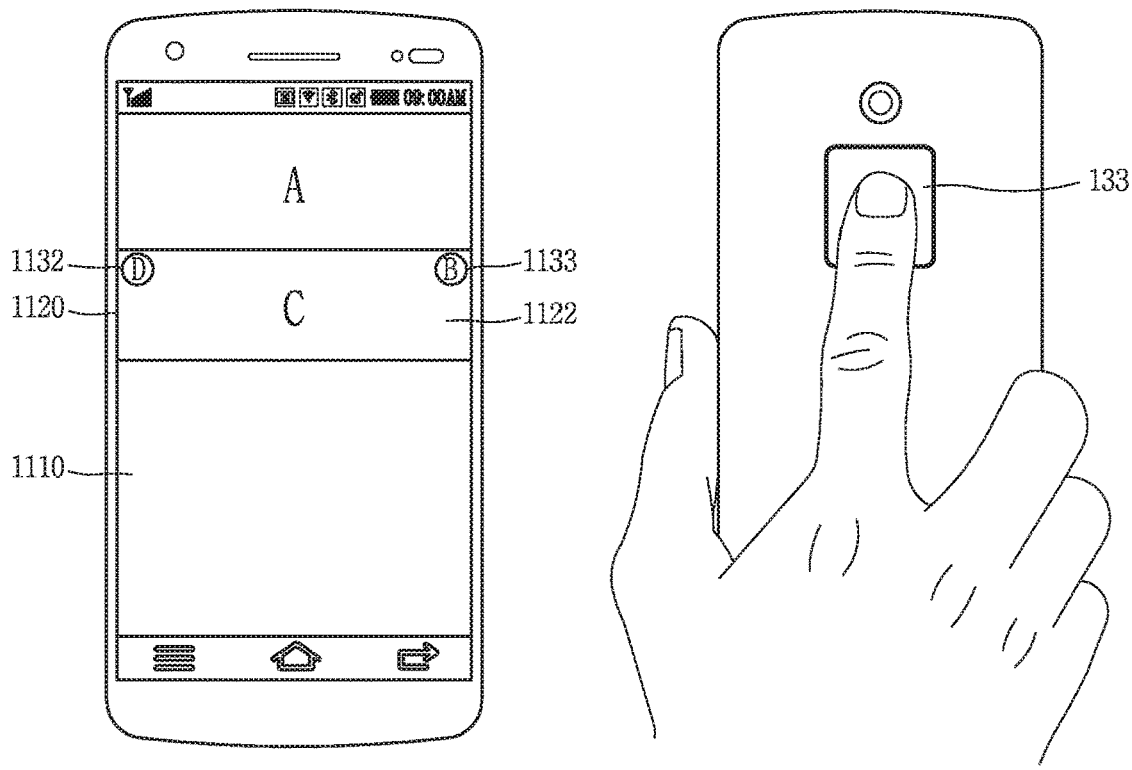

For example, as illustrated in FIG. 11B, in a state where the part of the screen C is output in the window 1120 and an icon D and an icon C are output on upper left and right ends of the window, respectively, when a drag input is applied to the rear input unit 133 sequentially in a direction a and a direction b (a→b), as illustrated in FIGS. 11C and 11D, the screen output in the window is switched from a part 1123 of the screen D back to the part 112 of the screen C.

Accordingly, the sequence of icon D→none→icon D is viewed on the upper left side of the window 1120 and the sequence of icon B→icons C and B→icon B is viewed on the upper right side of the window 1120.

Meanwhile, in order to maintain a popped-up state of a window, a touch applied to the rear input unit 133 should be maintained. Thus, the window may temporarily disappear (or fade out) and then appear (fade in) whenever a drag touch input is applied to the rear input unit 133.

Specifically, when a touch input is applied to the rear input unit 133 in one direction, the controller 180 may control the window such that screen information corresponding to one task gradually disappears and screen information corresponding to another task gradually appears. On the other hand, in a state where a two-finger based touch input is applied to the rear input unit 133, when one of the two fingers is maintained and the other finger is used to apply a touch input in one direction, a screen output in the window may be slid without a fade-out effect.

Figure 11E:
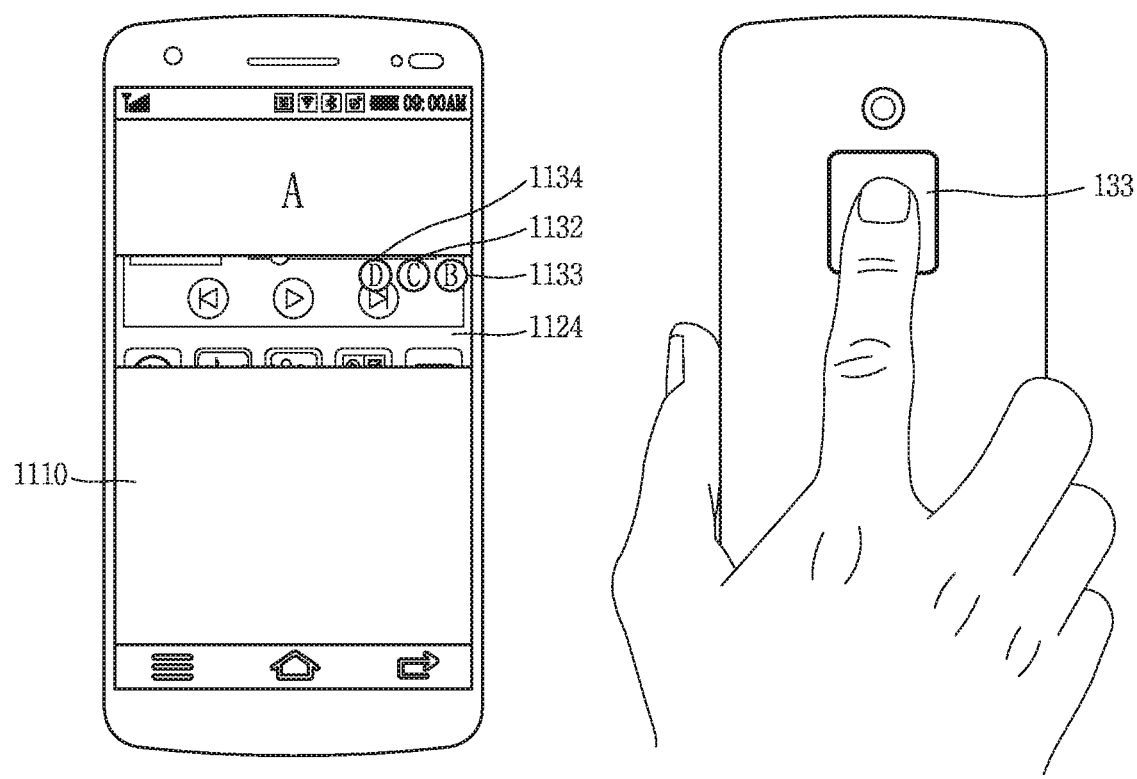

Also, when there is no other task corresponding to the one-directional touch input, the controller 180 may switch the screen information corresponding to the one task displayed in the window to a home screen. For example, although an icon is not output on the upper left side of the window 1120 in FIG. 11C, when a touch input is applied to the rear input unit 133 from left to right (a), as illustrated in FIG. 11E, a part of the home screen is displayed in the window 1120 and three icons, namely, icons D, C and B (1134, 1132, 1133) are output on the left upper side of the window.

Hereinafter, FIGS. 12A to 12C, 13A to 13C, 14A to 14C and 15A to 15C are views illustrating a method of bringing content displayed in a window to a foreground in a mobile terminal according to the present invention.

In the present invention, a window may be popped up only while a touch applied to the rear input unit 133 is maintained. Accordingly, the popped-up window can disappear after controlling a screen output on the display unit 151 using information output in the window, which can result in minimizing a screen obscuring time due to the window.

As another embodiment for minimizing a screen obscuring time due to the window, in order to quickly and easily bring information or content output in the window to a screen executed in a foreground, a touch applied to the rear input unit 133 and a touch applied to the display unit 151 may simultaneously be made.

Specifically, when at least one content selected in a popped-up window is dragged to an output area of first screen information, which is out of the window, a control command related to the selected content may be executed directly on the output area of the first screen information where the drag is released.

At this time, when a touch-up event is generated on the rear input unit 133 while the selected content is dragged, the controller 180 may cancel the execution of the control command related to the selected content.

Figure 12A:
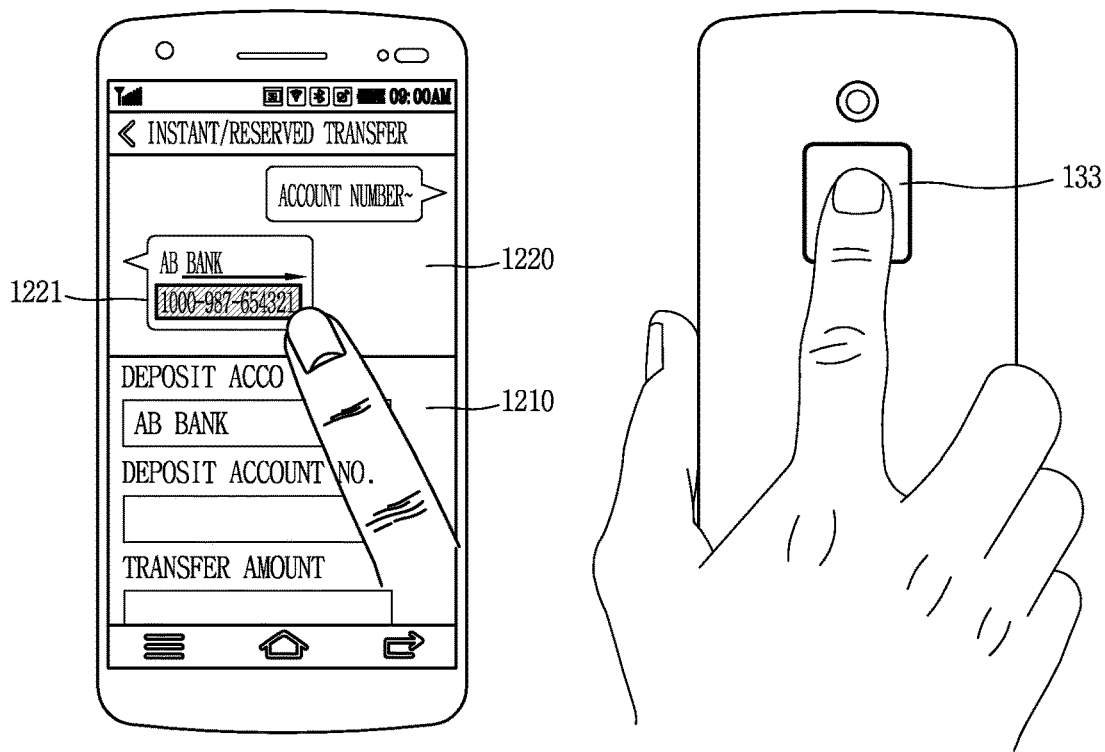
FIGS. 12A to 12C, 13A to 13C, 14A to 14C, and 15A to 15C are conceptual views illustrating a method of taking (moving) a content output on a window to a foreground, in a mobile terminal according to the present invention.
Figure 12B:
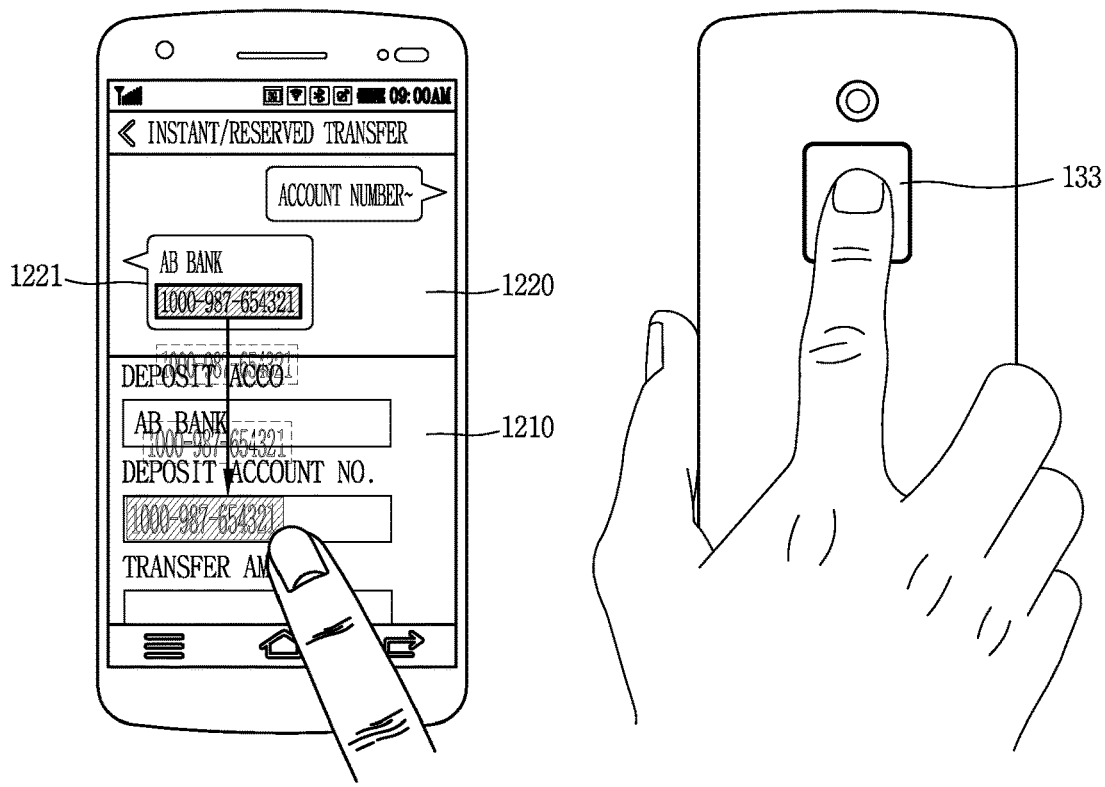
Figure 12C:
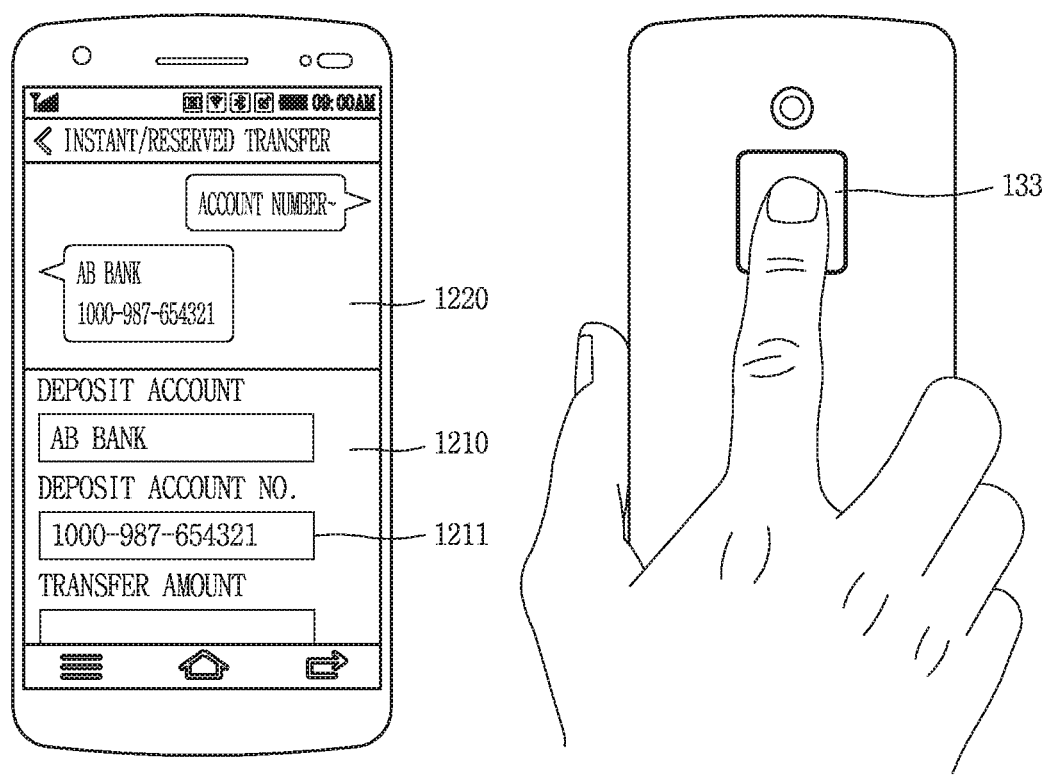

For example, as illustrated in FIGS. 12A to 12C, as a touch is maintained on the rear input unit 133 and desired message information 1221 within a popped-up window 1220 is dragged out, the corresponding information 1221 is copied. In this state, when the message information 1221 is dragged into an input area 1211 of first screen information 1210 to be pasted thereon, the message information 1221 is automatically input to the input area 1211.

Figure 13A:
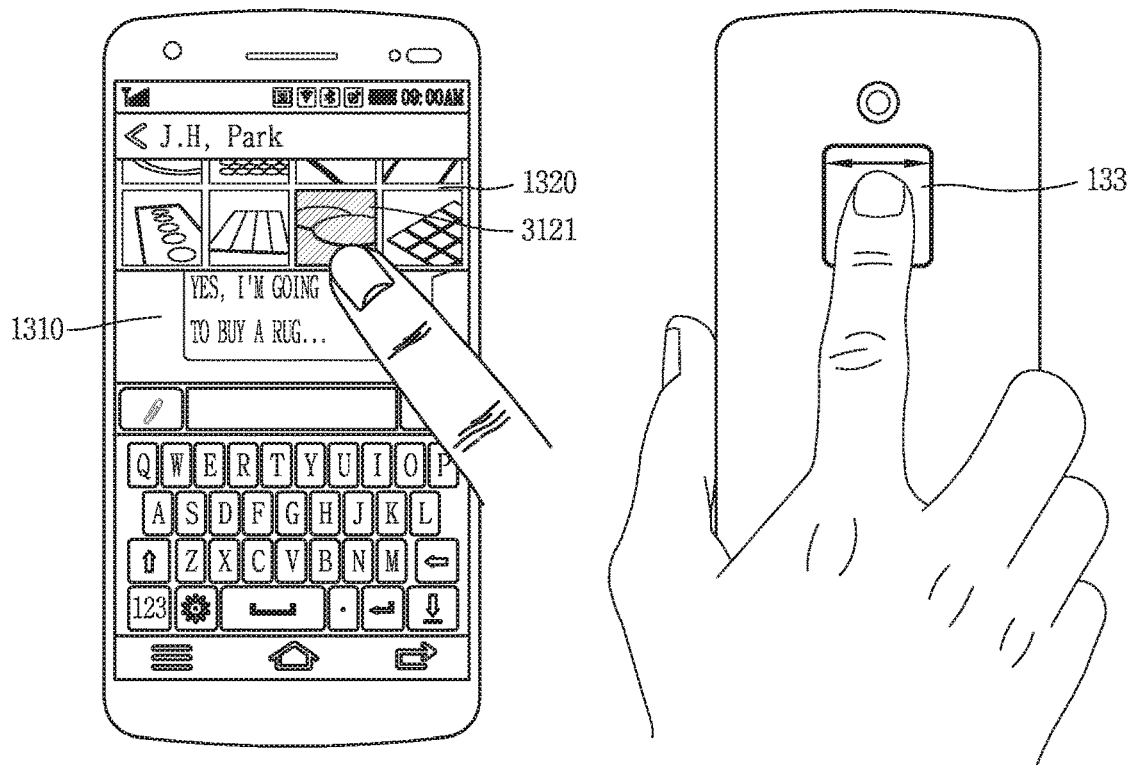
Figure 13B:
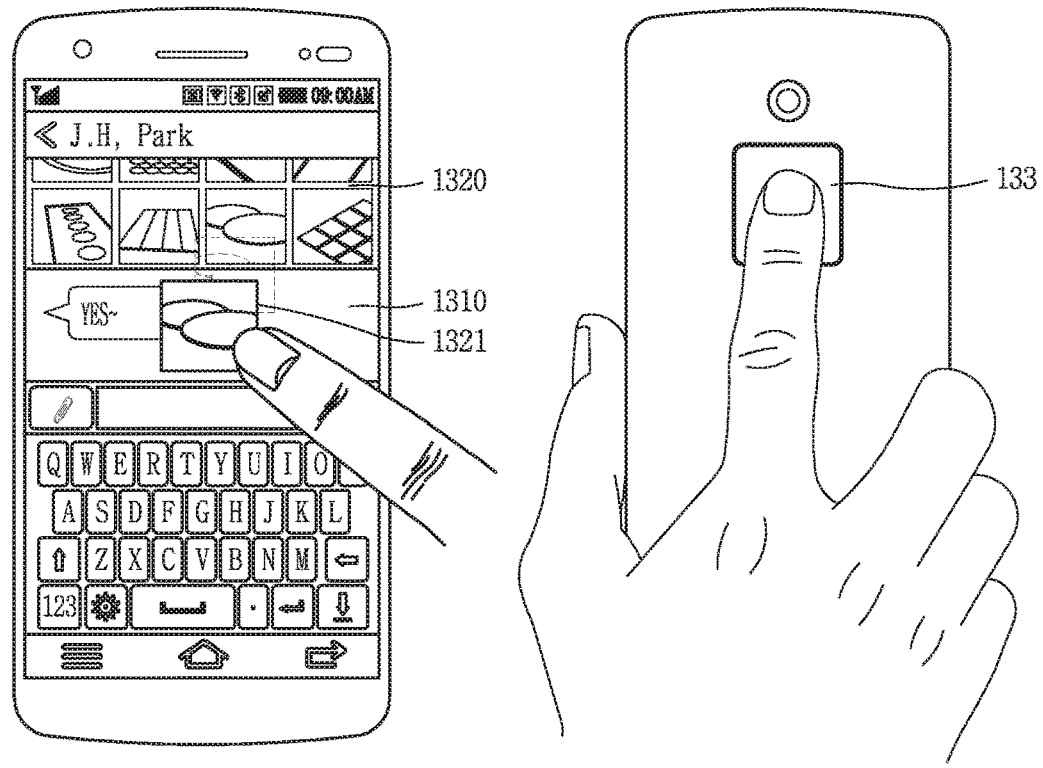
Figure 13C:
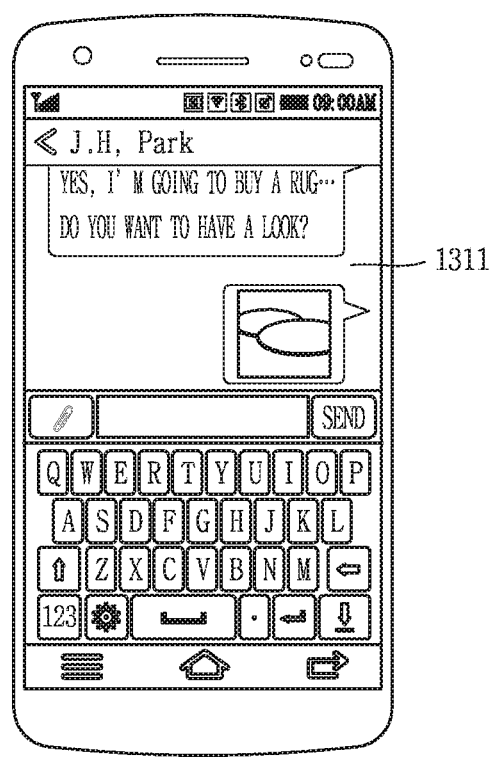

In another example, as illustrated in FIGS. 13A to 13C, similarly, as a touch applied to the rear input unit 133 is maintained and one 1321 of picture images output in a window 1320 is selected and then dragged to a chat screen area 1310 output on the display unit 151, the selected picture image 1321 is automatically transmitted to a counterpart terminal and a transmission result is displayed as a transmission message 1311 in the chat screen area 1310. In this instance, when the touch applied to the rear input unit 133 is released before the touch with respect to the selected picture image 1321 is released or when the image is moved back into the window 1320, a transmission command is canceled.

Figure 14A:
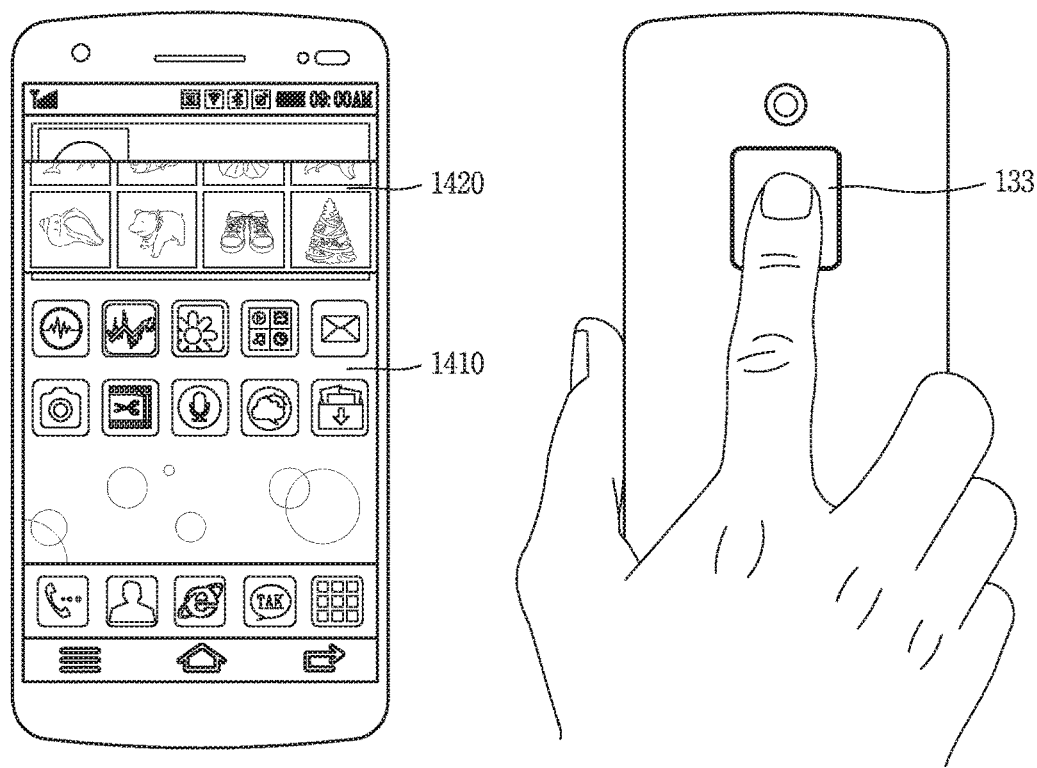
Figure 14B:
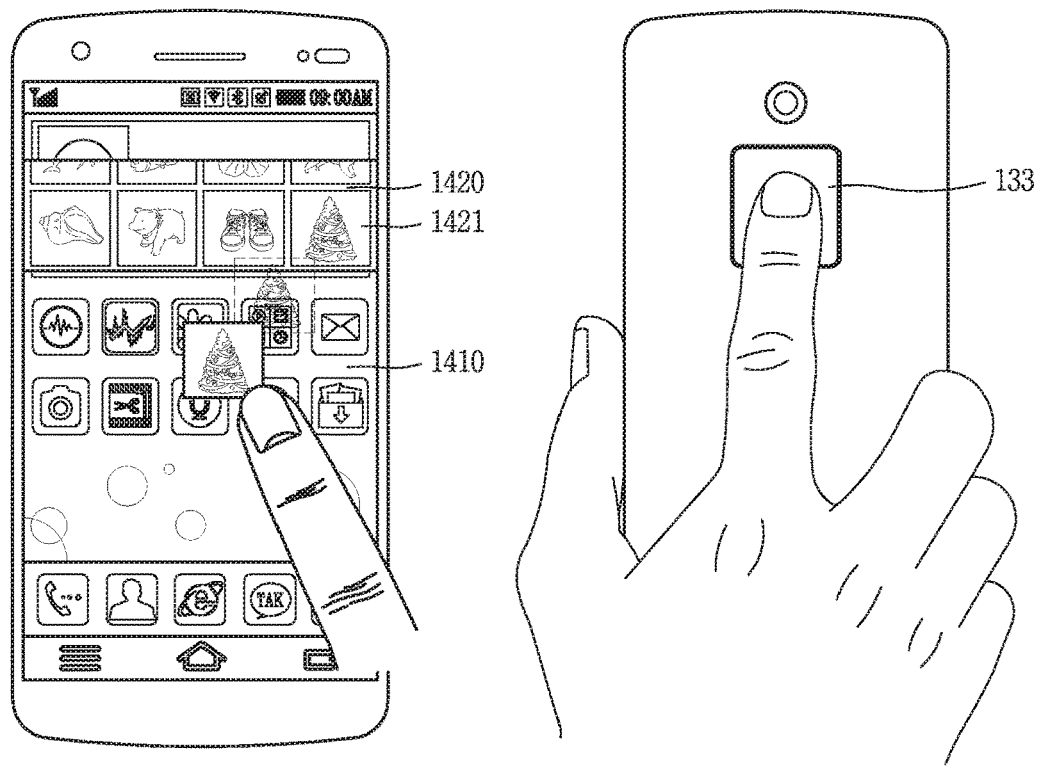
Figure 14C:
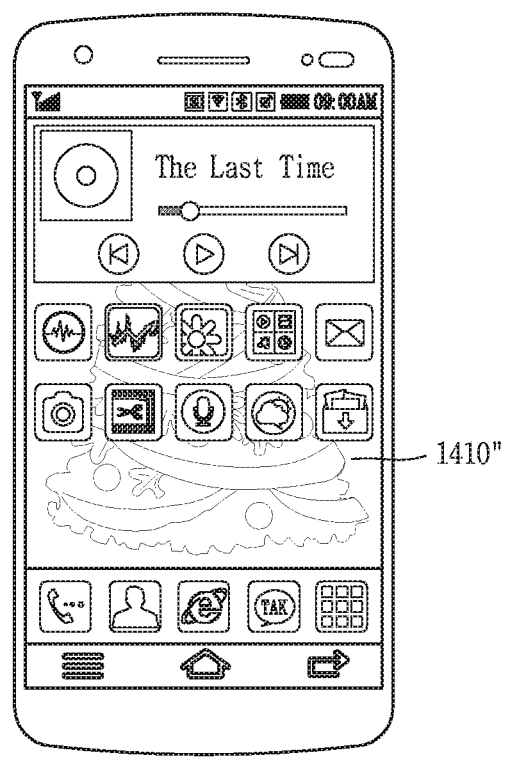

In another example, as illustrated in FIGS. 14A to 14C, as a touch applied to the rear input unit 133 is maintained and one 1421 of picture images displayed in a window 1420 is selected to be dragged to a home screen 1410 output on the display unit 151, the selected picture image 1421 is set (1410") as a background screen of the home screen 1410. At this time, although not illustrated, when a released point of the drag is on a specific icon of the home screen 1410, an image of the specific icon may be edited into the selected picture image 1421.

Figure 15A:
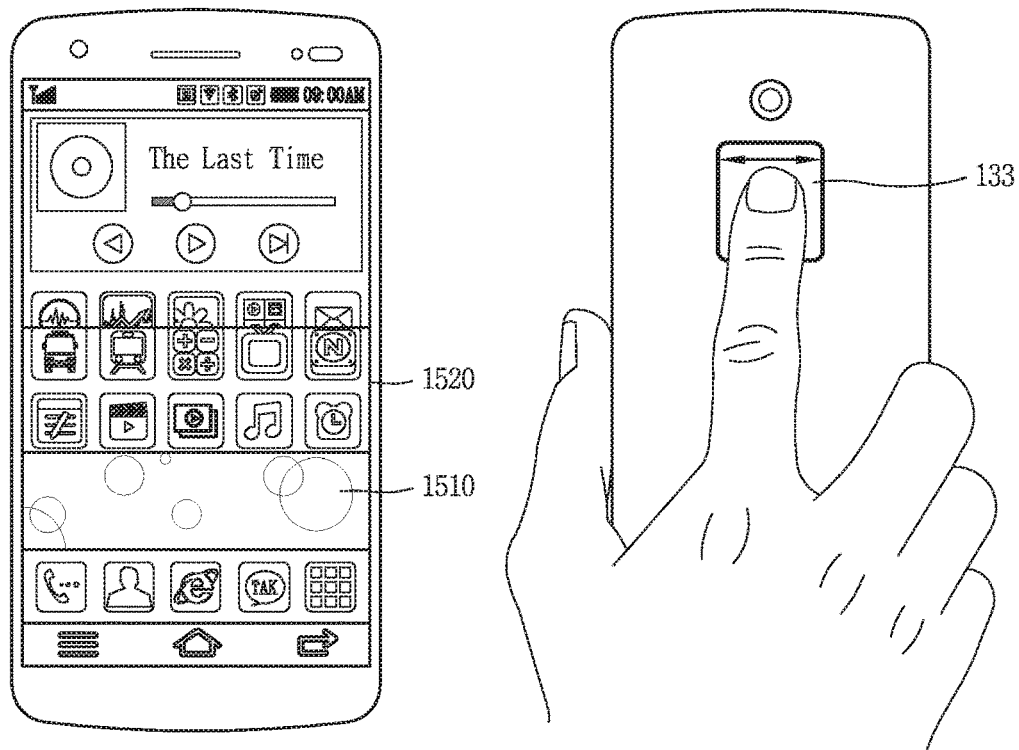
Figure 15B:
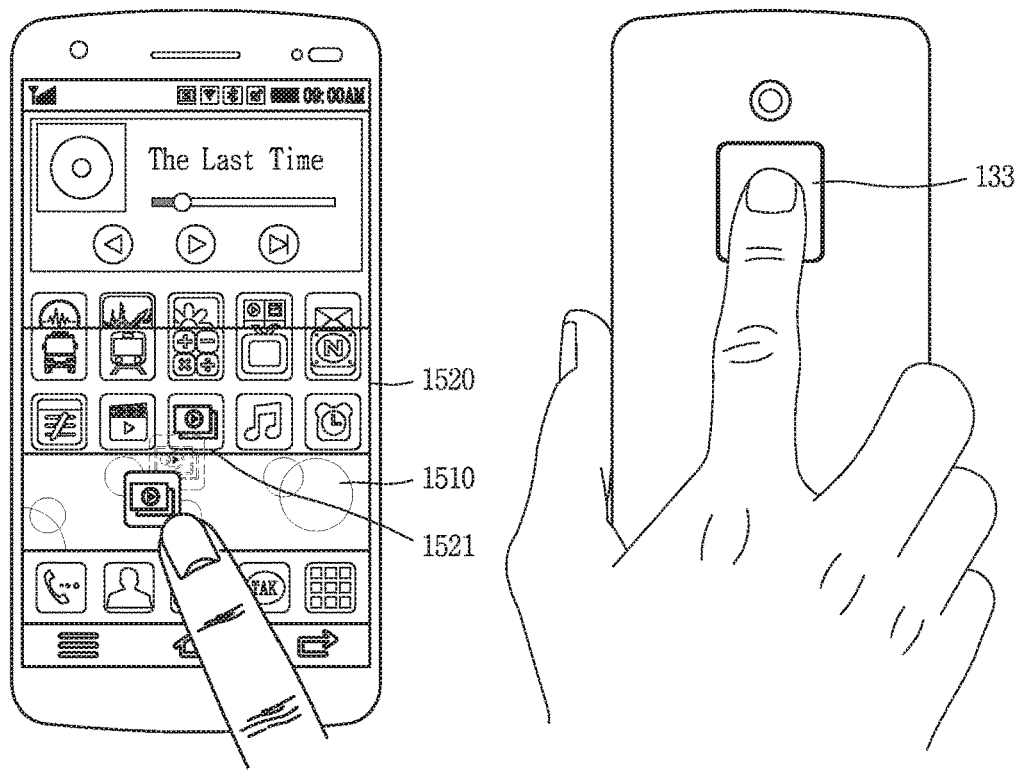
Figure 15C:
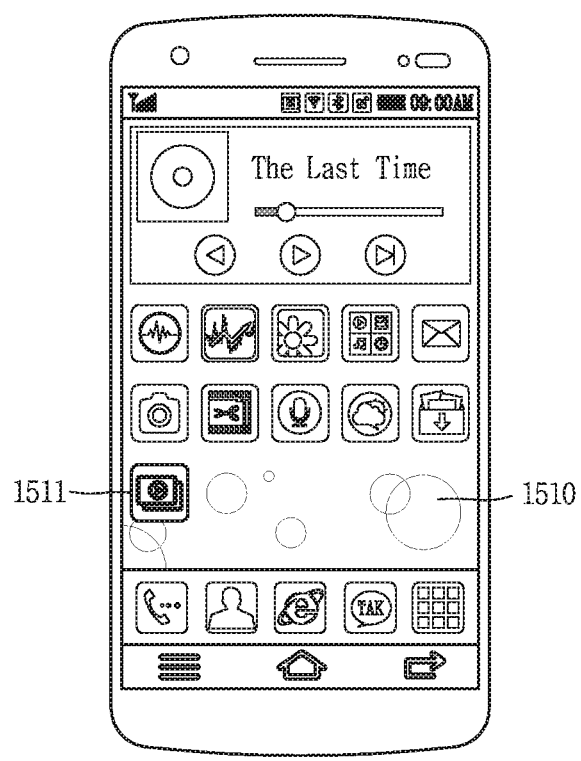

In another example, as illustrated in FIGS. 15A to 15C, in case where any previously-executed task is not present in an output state of a home screen 1510, when a preset touch input is applied to the rear input unit 133, an application tray is displayed in the popped-up window 1520. In this state, when a touch applied to the rear input unit 133 is maintained and one icon 1521 is selected from the tray output in the window 1520 and dragged to the home screen 1510, the selected icon 1521 may be added in the home screen 1510 (1511).

As another example, although not illustrated, when a touch applied to the rear input unit 133 is maintained and one sound source is selected from a sound source list displayed in the window 1420 and dragged to an area outside the window, the selected sound source may be automatically played back or set as a background music for first screen information currently output on the display unit 151.

The foregoing description has been given of the embodiments of temporarily checking information displayed in a window or controlling a current screen using it. On the other hand, when desiring to use screen information displayed in a window as a main screen, a screen displayed in the window may be switched to a foreground screen using a touch input applied to the display unit 151.

Hereinafter, FIGS. 16A to 16D are exemplarily views illustrating a method of displaying screen information displayed in a window in a foreground.

For example, in a state where a touch applied to the rear input unit 133 is maintained, a handler output on a boundary area of a window 1620 as described above is used, or a pinch-out touch input may be applied to the window 1620 to extend a size of the window 1620.

Figure 16A:
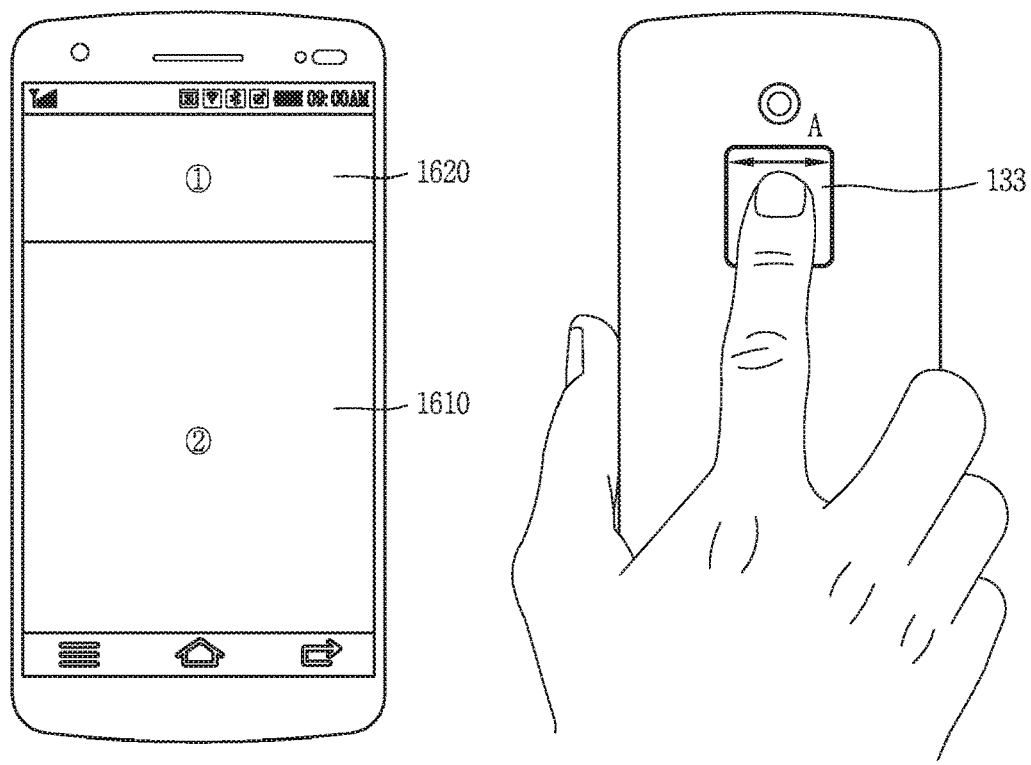
FIGS. 16A to 16D are conceptual views illustrating a method of outputting screen information displayed on a window on a foreground, in a mobile terminal according to the present invention.
Figure 16B:
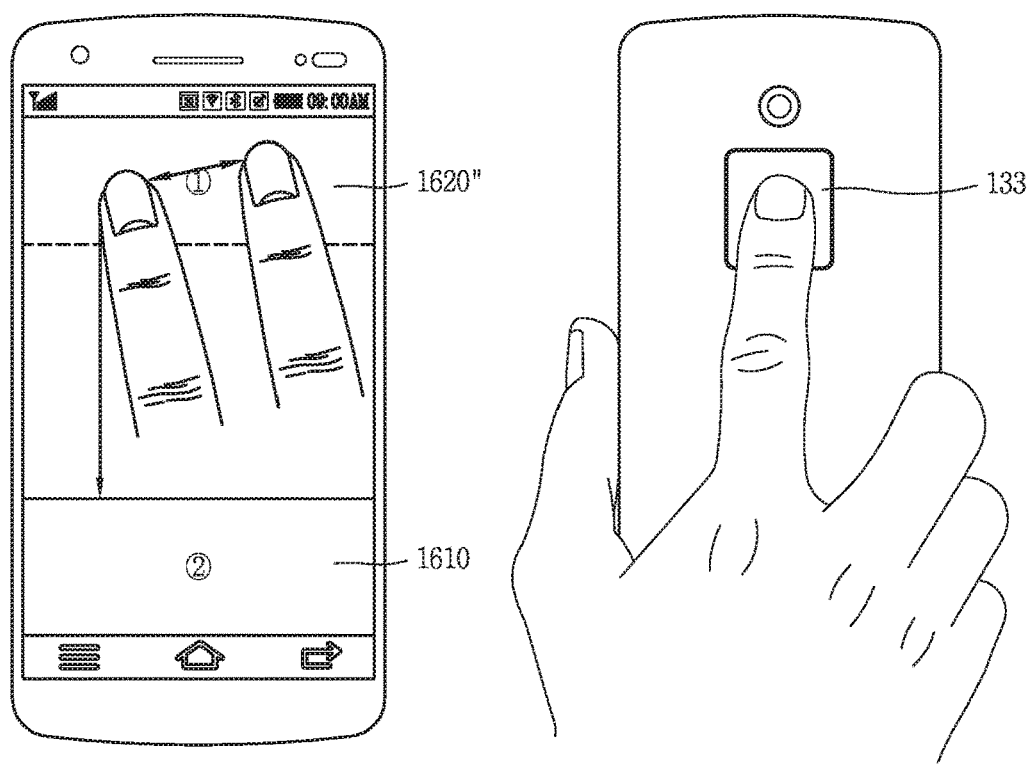
Figure 16C:
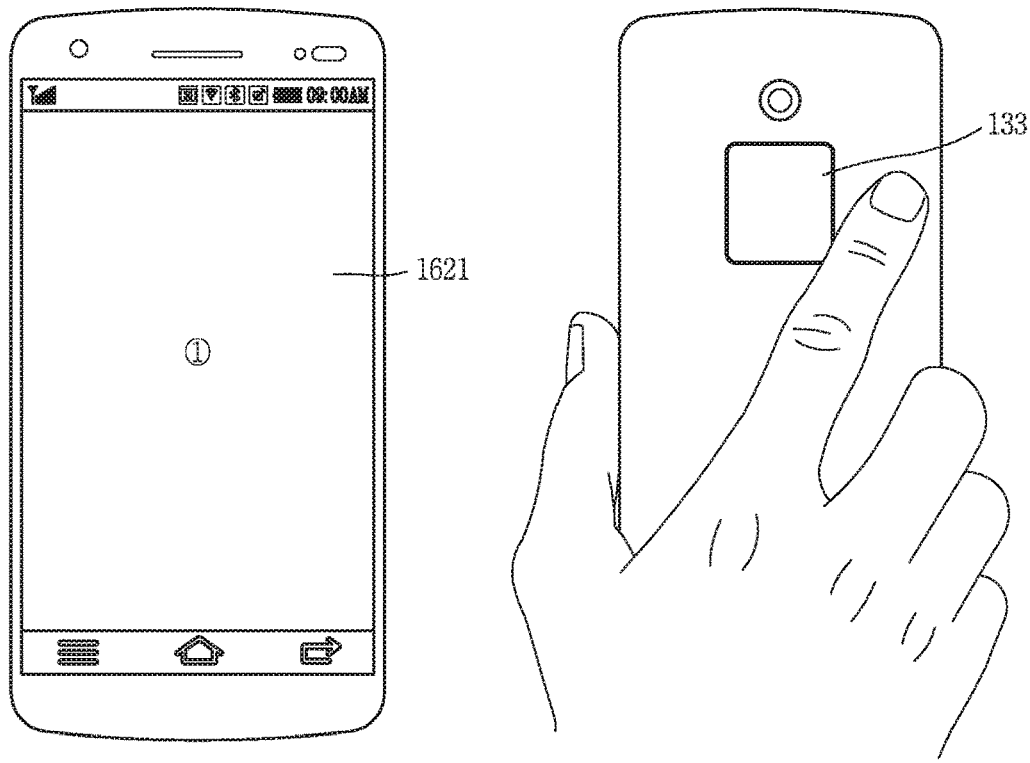

When the size of the extended window 1620" exceeds a reference value as a lower handler output on the boundary area of the window 1620 is dragged to a lower end of the display unit 151 or the pinch-out touch input is consecutively applied to the window 1620 as illustrated in FIG. 16B, the controller 180 may switch first screen information 1610 output on the display unit 151 to second screen information displayed in the window 1620". Accordingly, as illustrated in FIG. 16C, the first screen information 1610 disappears from the display unit 151, and the second screen information 1621 displayed in the window is continuously output even after the touch to the rear input unit 133 is released.

Figure 16D:
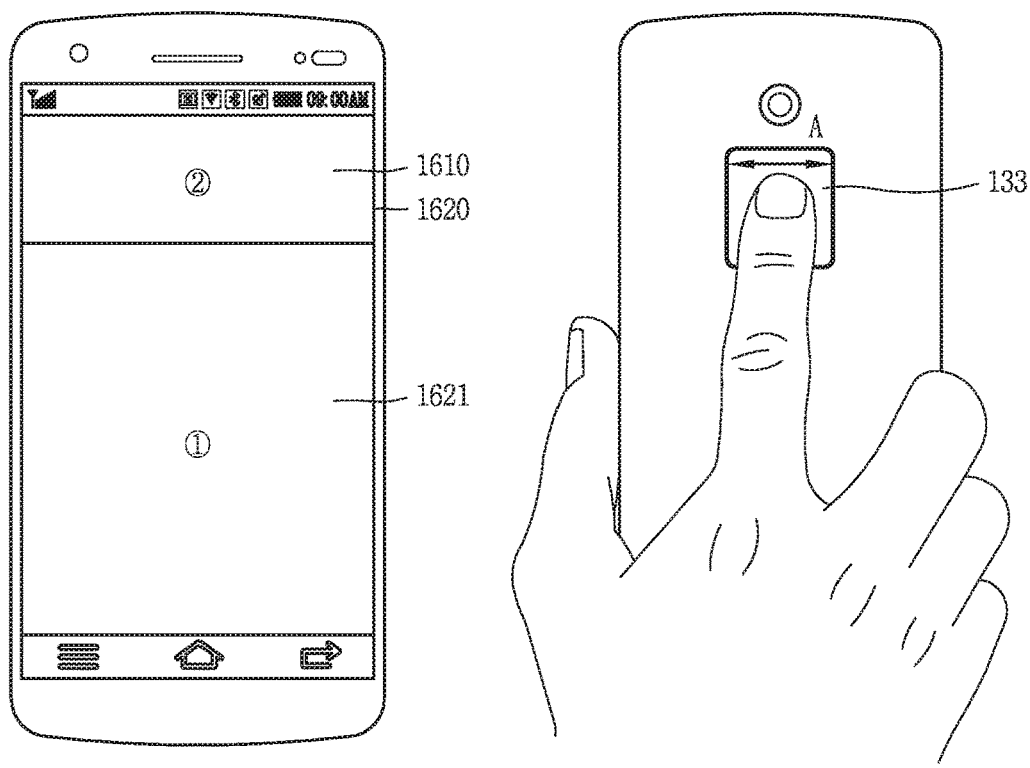

In this state, as illustrated in FIG. 16D, when a preset touch input A is applied again to the rear input unit 133, the controller 180 may control a part 1621 of the first screen information, which has been output on the display unit 151, to be output in the popped-up window 1620.

The foregoing description has been given of various embodiments on the assumption that a popped-up window disappears when a touch applied to the rear input unit 133 is released. Hereinafter, an embodiment in which a popped-up state of a window is maintained even after a touch applied to the rear input unit 133 is released will be described with reference to FIGS. 17A to 17D. On the basis of this, an embodiment in which a plurality of windows disclosed herein are output on the display unit 151 can be implemented using this.

Figure 17A:
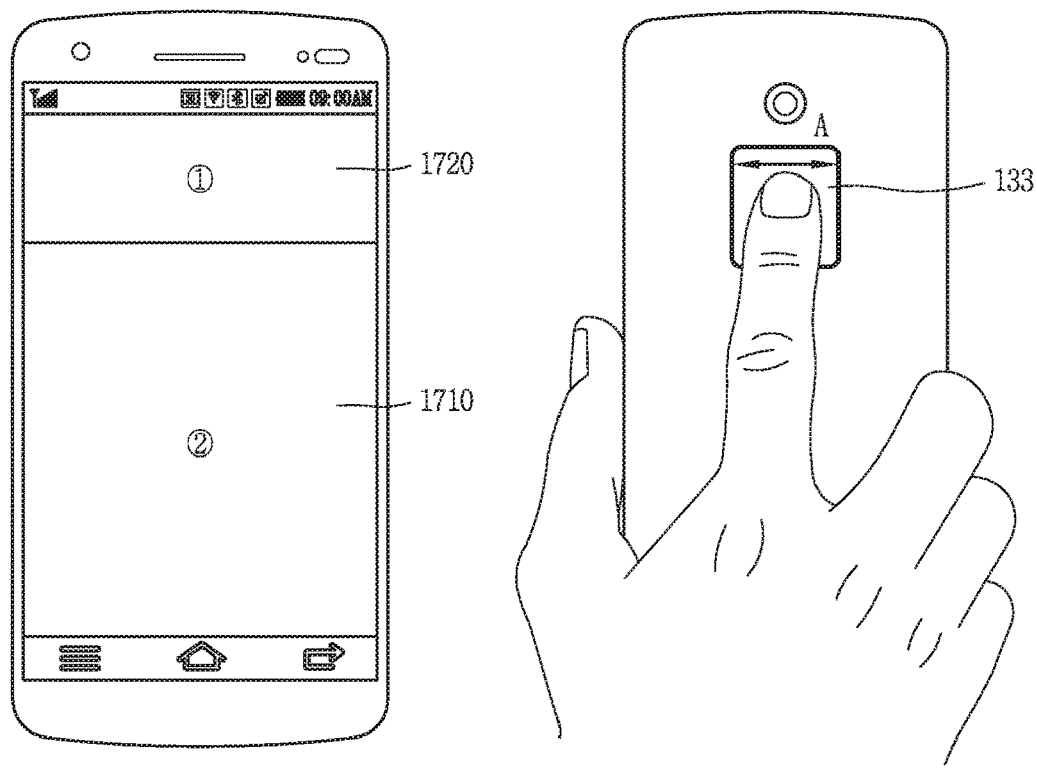
FIGS. 17A to 17D are conceptual views illustrating a method of outputting a plurality of windows using a touch input applied to a rear input unit, in a mobile terminal according to the present invention.
Figure 17B:
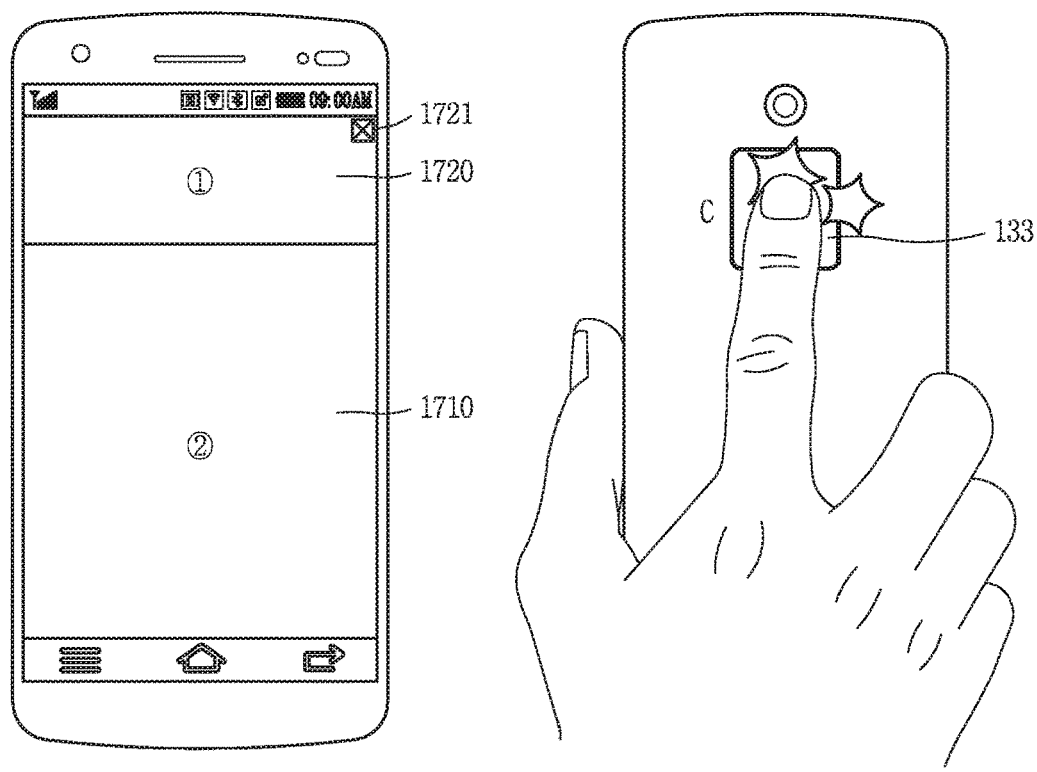

First, as illustrated in FIG. 17A, when a preset touch input A is applied to the rear input unit 133 in a state where first screen information (e.g., α2) 1710 is output on the display unit 151, a first window 1720 is popped up on a predetermined area. A part of a task screen (e.g., ①) that has been executed previously is displayed in the popped-up first window 1720.

Afterwards, when another preset touch input, for example, a double-short touch input or a drag input with a preset pattern is applied to the rear input unit 133, the controller 180 may fix the popped-up first window 1720 to the corresponding position. In this instance, a delete icon (e.g., 'x') 1721 for performing deletion may be displayed on one area, for example, an upper right side of the fixed first window 1720.

Then, even if the touch applied to the rear input unit 133 is released, the popped-up first window 1720 does not disappear.

Figure 17C:
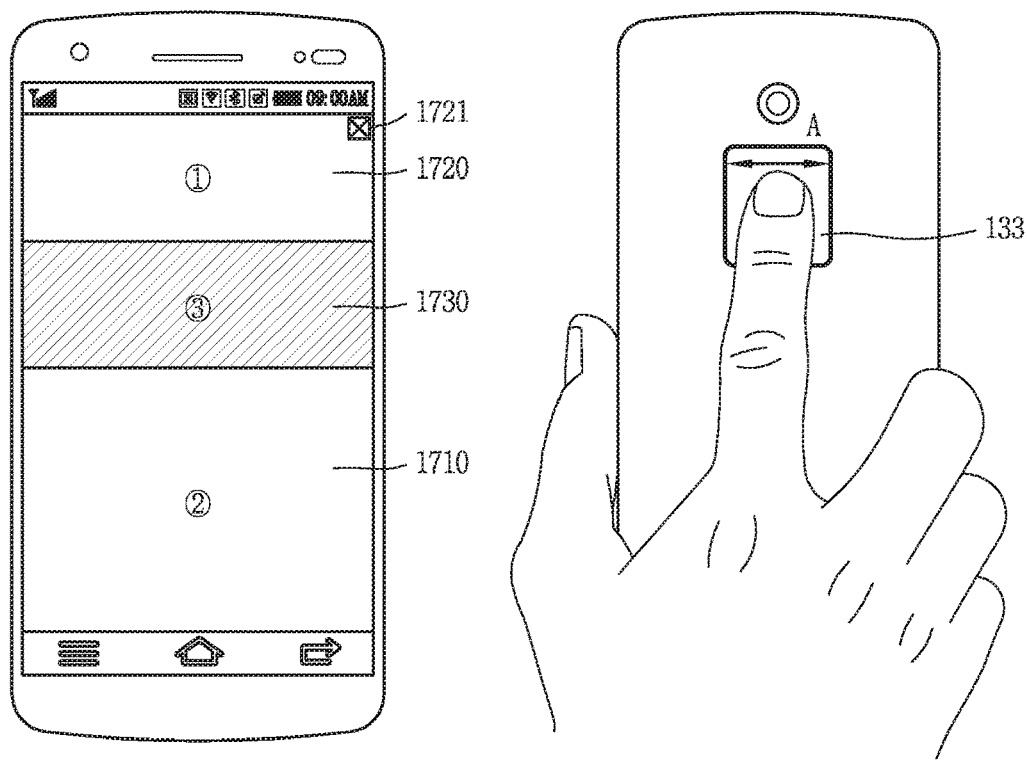

As illustrated in FIG. 17C, when the preset touch input A is applied again to the rear input unit 133, a second window 1730 is popped up on one area of the screen (α2). A part of a task screen (e.g., ③) executed before the screen (①) is displayed in the popped-up window 1730.

Figure 17D:
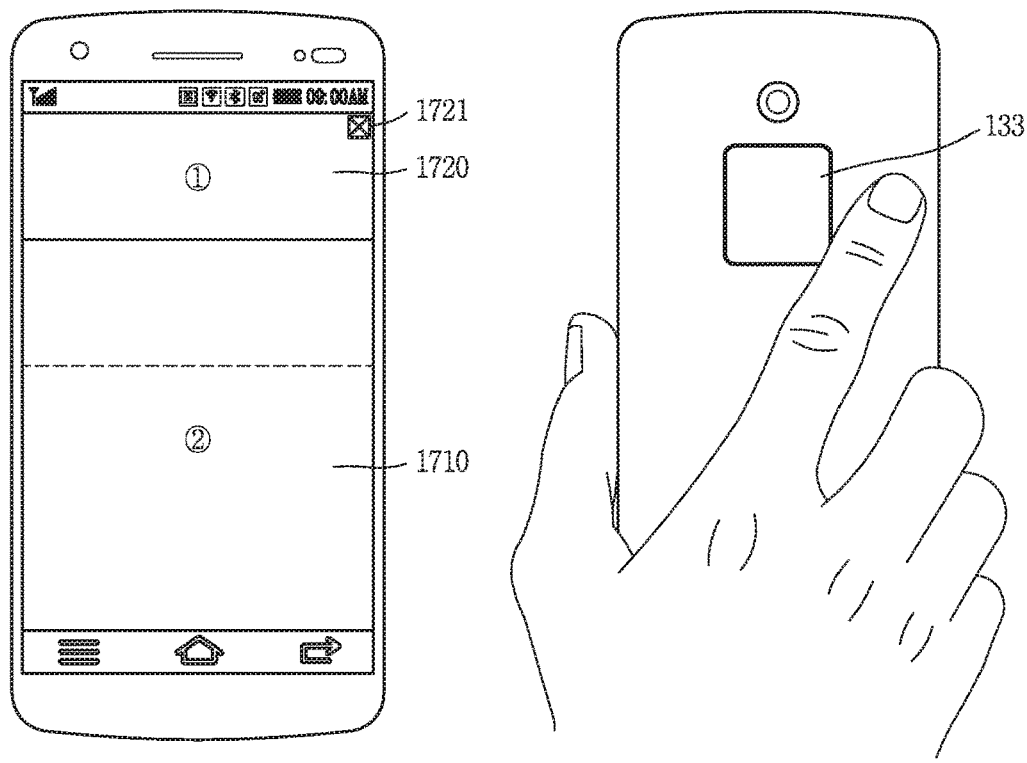

On the other hand, when the touch applied to the rear input unit 133 is released in a state where a touch input for fixing the second window 1730 is not applied to the rear input unit 133, as illustrated in FIG. 17D, the popped-up second window disappears and the fixed state of the first window is maintained.

When the delete icon output in the first window 1720 is selected, the controller 180 may control the first window 1720 to disappear. At this time, when the delete icon displayed in the first window 1720 is selected while the touch applied to the rear input unit 133 is maintained, a position of the popped-up second window 1730 may be changed to the position where the first window 1720 has been fixed.

As described above, in a mobile terminal according to embodiments of the present invention, a new type of user interface can be implemented by using a user input unit provided on a rear surface of a terminal body, and effective multitasking can be executed by allowing use of he rear input unit to check or control a screen of an application currently executed in a background. Also, a screen of an application currently executed in a background can be output through the rear input unit and a screen displayed in a foreground can be controlled through a front touch screen, thereby more intuitively controlling a plurality of layered screens according to positions of the input units. In addition, a screen of an application currently executed in a background can be popped up only while a touch is applied to the rear input unit, and then the popped-up screen can disappear when the touch is released. This may allow user-desired information to be quickly caught in different tasks and minimize a time for which a screen currently output in the foreground is obscured.

The above-described mobile terminal is not limited to the configuration and method of the embodiments described above, but all or part of the embodiments may be selectively combined so that various modifications may be made in the embodiments.

The invention claimed is:

1. A mobile terminal, comprising:
a terminal body provided with a front surface and a rear surface;
a display unit disposed on the front surface;
a rear input unit disposed on the rear surface; and
a controller configured to:
cause the display unit to display first screen information of a first application;
cause the display unit to display a window area on a first area of the first screen information when a preset touch input is applied to the rear input unit such that the window area is displayed while the preset touch input is applied to the rear input unit;
cause the display unit to display a part of a home screen in the window area such that at least a portion of the first screen information and a portion of the home screen are displayed together on the display unit;
execute a second application and cause the display unit to display a part of second screen information of the second application in the window area when an application icon corresponding to the second application is selected from the part of the home screen displayed in the window area while the preset touch input is detected on the rear input unit; and
execute a control command related to specific content of the part of the second screen information when the specific content is dragged from the window area and when the dragged specific content is released at a second area of the first screen information.

2. The terminal of claim 1, wherein:
the specific content is dragged in response to a touch input received on the display unit while the preset touch input is maintained at the rear input unit;
the preset touch input is an input that is applied to the rear input unit and then dragged to left and right or up and down by a predetermined number of times or dragged in a preset pattern; and
the displayed window area disappears when the preset touch input is no longer detected on the rear input unit.

3. The terminal of claim 2, wherein:
the part of the second screen information displayed in the window area gradually disappears when the preset touch input is no longer detected on the rear input unit; and
the window area and the part of the second screen information are displayed again when the preset touch input is applied on the rear input unit again within a reference time.

4. The terminal of claim 1, wherein:
a size of the window area is set according to pressure strength of the preset touch input applied to the rear input unit in a perpendicular direction; and
the first application is executed in a foreground and the second application is executed in a background.

5. The terminal of claim 1, wherein a position of the window area is changed as a touch applied to the rear input unit is moved up and down while the window area is displayed.

6. The terminal of claim 1, wherein a position of the window area on the display unit corresponds to a point where a touch has been initially applied to the rear input unit.

7. The terminal of claim 1, wherein the controller is further configured to cause the display unit to:
display a handler on a boundary area of the displayed window area when a touch is applied to the boundary area; and
change at least one of a size or a position of the window area as the touch is further applied to the handler and the touched handler is dragged.

8. The terminal of claim 1, wherein the controller is further configured to control the display unit such that the part of the second screen information displayed in the window area disappears and an obscured part of the first screen information is displayed along a trajectory of a touch applied to the display unit when the touch started from a point outside the window area on the display unit is moved into the window area.

9. The terminal of claim 1, wherein the controller is further configured to:
control the display unit such that a first area displayed within the window area moves along a drag input when the drag input is applied within the displayed window area; and
cause the display unit to display a second area different from the first area on a position where the first area has been displayed.

10. The terminal of claim 1, wherein the controller is further configured to:
execute a first control command caused by a first touch input applied to the display unit within the window area when the first touch input is detected within the window area; and
execute a second control command caused by a second touch input applied to the display unit with respect to the first screen information when the second touch input is detected outside the window area.

11. The terminal of claim 1, wherein the controller is further configured to:
recognize a touch input applied to the rear input unit in one direction while the part of the second screen information corresponding to the second application of the plurality of applications is displayed in the window area; and
cause the display unit to display a part of the second screen information corresponding to a third application among the plurality of applications instead of the part of the screen information corresponding to the second application of the plurality of applications in response to the recognized touch input.

12. The terminal of claim 11, wherein the controller is further configured to control the display unit such that the part of the second screen information corresponding to the second application of the plurality of applications gradually disappears and the part of the second screen information corresponding to the third application gradually appears as the touch input is applied to the rear input unit in the one direction.

13. The terminal of claim 11, wherein, when the part of the second screen information corresponding to the second application of the plurality of applications is switched to the part of the second screen information corresponding to the third application, the controller is further configured to cause the display unit to display an icon notifying the second application of the plurality of applications that is not being displayed on a position of the window area corresponding to the applied direction of the touch input.

14. The terminal of claim 11, wherein the part of the second screen information corresponding to the second application of the plurality of applications displayed in the window area is switched to the part of the home screen when the third application corresponding to the touch input applied in the one direction is not present.

15. The terminal of claim 1, wherein executing the control command comprises displaying the specific content at the second area of the first screen information at which the dragged specific content is released.

16. The terminal of claim 1, wherein the specific content is not displayed at the second area of the first screen information when the preset touch input is no longer detected on the rear input unit while the specific content is dragged.

17. The terminal of claim 1, wherein:
the first screen information is switched to the second screen information displayed in the window area when a size of the window area exceeds a reference range; and
the controller is further configured to cause the display unit to display a part of the first screen information within the window area in response to a second preset touch input being applied to the rear input unit.

18. The terminal of claim 1, wherein the controller is further configured to:
fix a first window area when a second touch input is applied to the rear input unit while the first window area is displayed in at least one area of the first screen information; and
cause the display unit to display a second window area, distinguished from the first window area, in one area of the first screen information when the preset touch input is applied to the rear input unit.

19. The terminal of claim 18, wherein:
the fixed first window area displays thereon a delete icon for executing deletion; and
the fixed first window area disappears and the second window area is displayed on a position where the first window area has been displayed when the delete icon is selected.

\* \* \* \* \*